US010367947B2

(12) United States Patent
Ginter

(10) Patent No.: US 10,367,947 B2
(45) Date of Patent: *Jul. 30, 2019

(54) TECHNIQUES FOR MIGRATING LEGACY 911 SYSTEMS TO NG-911 SYSTEMS

(71) Applicant: Bandwidth.com, Inc., Raleigh, NC (US)

(72) Inventor: Thomas Ginter, Raleigh, NC (US)

(73) Assignee: BANDWITH.COM, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,330

(22) Filed: Jun. 6, 2017

(65) Prior Publication Data

US 2018/0352094 A1 Dec. 6, 2018

Related U.S. Application Data

(63) Continuation of application No. 15/614,726, filed on Jun. 6, 2017, now abandoned.

(51) Int. Cl.
*H04M 3/51* (2006.01)
*H04M 7/00* (2006.01)
(Continued)

(52) U.S. Cl.
CPC ...... *H04M 7/0087* (2013.01); *H04L 65/1046* (2013.01); *H04M 3/5116* (2013.01); *H04W 88/023* (2013.01); *H04W 76/50* (2018.02)

(58) Field of Classification Search
CPC combination set(s) only.
See application file for complete search history.

(56) References Cited

U.S. PATENT DOCUMENTS

2007/0121798 A1* 5/2007 Croy ................. H04L 29/06027 379/37
2008/0261557 A1* 10/2008 Sim ......................... H04W 4/02 455/404.2

(Continued)

*Primary Examiner* — Maria El-Zoobi
(74) *Attorney, Agent, or Firm* — Kilpatrick Townsend & Stockton LLP

(57) ABSTRACT

Disclosed are techniques for enabling an emergency call routing system. The system comprises a Voice-over Internet Protocol (VoIP) position center (VPC) server and a location information server (LIS). The VPC server may be configured to receive a session initiation protocol (SIP) INVITE for an emergency call intended for a destination public safety answering point (PSAP) from a telecommunication service provider (TSP) SIP call server. The VPC may also respond to the source of the SIP INVITE message with a SIP redirect response that includes routing data compatible with and capable of enabling the TSP SIP call server to route the emergency call to the destination PSAP. The LIS server may be configured to receive and store telephone number provisioning information from a TSP, the information including registered address data for the telephone number. The LIS may also receive and store PSAP capability data, the PSAP capability data indicative of the PSAP being i2 capable or i3 capable. For i2 capable PSAPs, the LIS may receive and respond to address requests for the telephone number that initiated the emergency call. For i3 capable PSAPs, the LIS may provide the VPC a PIDF-Lo formatted location object within the SIP redirect response.

21 Claims, 13 Drawing Sheets

100

(51) Int. Cl.

| | |
|---|---|
| ***H04W 88/02*** | (2009.01) |
| ***H04L 29/06*** | (2006.01) |
| *H04W 76/50* | (2018.01) |

(56) References Cited

U.S. PATENT DOCUMENTS

2008/0267172 A1* 10/2008 Hines ................ H04L 29/12594 370/352
2009/0275350 A1* 11/2009 Poremba ................. H04L 51/12 455/466
2012/0309340 A1* 12/2012 Ray ......................... H04W 4/90 455/404.2
2012/0317317 A1* 12/2012 Kristiansson ....... G06F 13/4081 710/16
2013/0303107 A1* 11/2013 Mitchell, Jr. ........... H04W 4/90 455/404.2
2014/0179260 A1* 6/2014 Malin ..................... H04W 4/90 455/404.2
2016/0255483 A1* 9/2016 Parlamas ................ H04W 4/22 455/404.2

* cited by examiner

100

TECHNIQUES FOR MIGRATING LEGACY 911 SYSTEMS TO NG-911 SYSTEMS

CROSS-REFERENCE TO RELATED APPLICATIONS

This application is a continuation of and claims the benefit of co-pending application Ser. No. 15/614,726 filed Jun. 6, 2017 entitled "Techniques For Migrating Legacy 911 Systems to NG-911 Systems".

BACKGROUND

Many of the next generation 911 (NG9-1-1) services and Emergency Services Intranet (ESINet) solutions available today are designed to replace the legacy selective router (S/R) and Automatic Location Identification (ALI) database solutions that currently deliver 9-1-1 traffic to Public Safety Answering Point(s) (PSAPs). However, not all NG9-1-1 deployments are a smooth and ubiquitous replacement of existing infrastructure. Rather, in a given region there may be multiple ESINet solutions coexisting with legacy PSAPs served by legacy S/R and ALI solutions. In such cases, a problem arises where the Telecommunications Service Providers (TSPs) that originally connected to only one S/R for delivery of 9-1-1 traffic in a region, now may need to divide 9-1-1 traffic and deliver it to multiple ESINets as well as the legacy S/R. This places a burden on the TSP to "pre-route" 9-1-1 traffic based on the location of the destination PSAP.

What is needed is an ability to receive all 9-1-1 traffic for a region served by multiple parties, perform location based routing on the 9-1-1 traffic and appropriately pass the 9-1-1 traffic to the correct serving ESINet or serving S/R based on PSAP capabilities.

DETAILED DESCRIPTION

Figure 1:
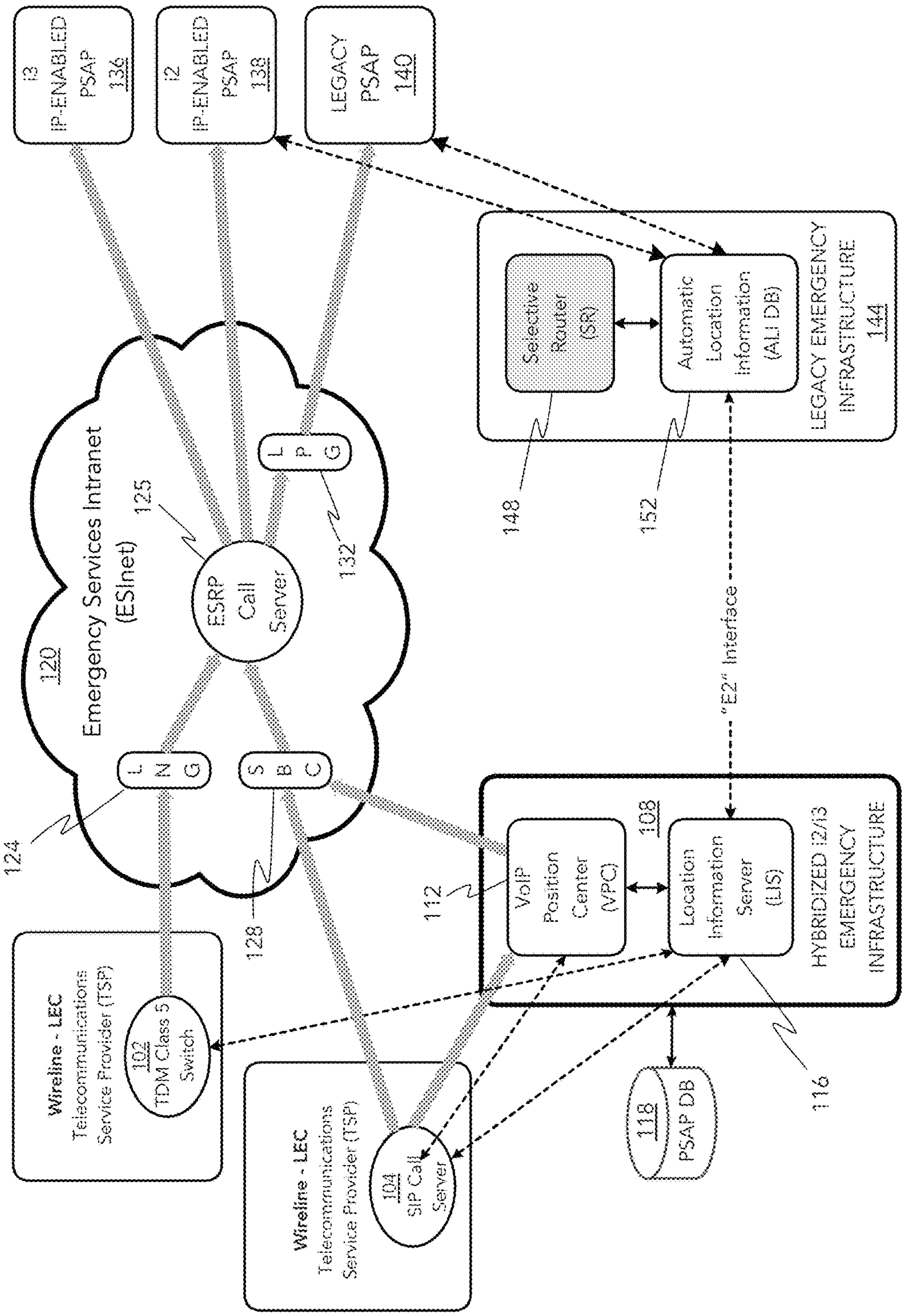
FIG. 1 illustrates a generalized Legacy to NG-911 network topology according to an embodiment.

Throughout this specification numerous acronyms relevant to 911 call routing systems are used. For ease of reference an acronym table is included below.

TABLE 1

| ACRONYMS | |
|---|---|
| ALI | Automatic Location Identification |
| ANI | Automatic Number Identification |
| CAMA | Centralized Automatic Message Accounting |
| CLEC | Competitive Local Exchange Carrier |
| E-911 | Enhanced 911 Service |
| ECRF | Emergency Call Routing Function |
| ERDB | Emergency Routing Database |
| ESGW | Emergency Service Gateway |
| ESGW-RI | Emergency Services Gateway Route Identifier |
| ESINet | Emergency Services IntraNet |
| ESLK | Emergency Service Landline Key |
| ESN | Emergency Service Number |
| ESQK | Emergency Service Query Key |
| ESRK | Emergency Service Routing Key |
| ESRP | Emergency Service Routing Proxy |
| ESZ | Emergency Service Zone |
| i2 | (transitional Standard for VoIP 911) |
| i3 | (fully Implemented Standard for VoIP 911) |
| ILEC | Incumbent Local Exchange Carrier |
| IP | Internet Protocol |
| LEC | Local Exchange Carrier |
| LIS | Location Information Service |
| LNG | Legacy Network Gateway |
| Lo | Location Object |
| LPG | Legacy PSAP Gateway |
| LRO | Last Routing Option |
| MPC | Mobile Positioning Center |
| MSAG | Master Street Address Guide |
| NCAS | Non-Call Path Associated Signaling |
| NENA | National Emergency Number Association |
| NG-911 | Next Generation 911 Service |
| OSP | Originating Service Providers |
| pANI | Pseudo-ANI |
| PIDF-Lo | Presence Information Data Format Location Object |
| PSAP | Public Safety Answering Point |
| PUC | Public Utilities Commission |
| SBC | Session Border Controller |
| SIP | Session Initiation Protocol |
| SR | Selective Router |
| TDM | Time Division Multiplex (Circuit-Switched Telephony Network Protocol) |
| TSP | Telecommunications Service Provider |
| UA | User Agent |
| VoIP | Voice over Internet Protocol |
| VPC | VoIP Position Center |
| VSP | VoIP Service Provider |
| WSP | Wireless Service Provider |

This specification describes techniques transitioning legacy 911 systems and infrastructures to a fully functional NG9-1-1 ESINet including techniques for the depopulation of a traditional ALI database during the transition.

The complete conversion of a legacy Enhanced 9-1-1 system to fully i3 compliant NG9-1-1 systems necessitates the depopulation and decommissioning of the ALI database. In the NENA vision of Next Generation 9-1-1, the ALI database is replaced by Originating Service Providers (OSP) installation and use of Location Information Service (LIS) systems. In a fully i3 compliant NG-911 deployment, the OSP would send only SIP PIDF-Lo enabled traffic to the ESINet where the "Lo" (Location Object) meets all requirements for geo-routing, location display (at the PSAP), re-bid (in the case of mobile OSP's), etc. The use of pANI, shell record, ESQK and ESRK techniques would be eliminated from the solution.

Ironically, to eliminate the "shell technique" and ALI database, means using the ALI database and the shell technique more extensively during the transition period. First, a LIS for the TSP (landline) records and the concept of a "Landline" shell record are introduced. A new term, "Emergency Service Landline Key" (ESLK), is created for this new type of shell record. Next we can depopulate the ALI database of landline TSP records to the LIS. For PSAP's needing an ALI location record, the ALI uses a shell record and the E2 interface to our "transitional" LIS in the same way as i2 VOIP today. The E2 interface protocol provides the industry standard signaling protocol between a 911 service provider's VPC and the ALI database.

For call routing, the TSP, which may be a LEC, will interact with the ESINet in a hybridized i2/i3 technique to be described in greater detail below depending on the methodology of delivery (e.g., within the call flow or outside the call flow). The term "hybridized i2/i3" refers to systems and techniques that can handle VoIP 911 calls intended for PSAPs that may be circuit-switched (i.e., legacy), transitionally IP enabled (i.e., i2), or fully IP enabled (i.e., i3). Once a PSAP connected to the ESINet converts from legacy CAMA and legacy ALI connections, or from transitionally IP enabled to become fully IP enabled, the hybridized i2/i3 delivery technique converts to normal SIP PIDF-Lo and the need for shell records is eliminated for this PSAP. When the last PSAP can receive SIP PIDF-Lo, the ALI is finally depopulated of its last shell records and can be retired.

Because the conversion or migration of all PSAPs to full i3 compliance may take several years, a well thought out transition implementation of 911 call delivery services is necessary. As alluded to above, there are two primary methodologies addressed in this specification for delivering 911 calls to the proper PSAP. The first may be characterized as "in call flow" processing while the second may be characterized as "out of call flow" processing.

For "in call flow" processing, the wireline TSP passes the call to a 911 service provider. The 911 service provider takes over full call control and processes the SIP INVITE and carriages the RTP (voice) stream on its facilities to the desired ESRP server within the ESINet. The "out of call flow" processing method uses a proxy redirect server that does not pass the full voice call to the 911 Service Provider. Rather, the TSP SIP call server sends the initial 911 call SIP INVITE to a redirect proxy server within the VPC which routes the call by issuing a SIP REDIRECT but does so with the inclusion of the necessary routing information to the desired ESRP server within the ESINet. For example, the necessary routing information to be included could be an ESQK, ESLK or PIDF-Lo object.

Throughout the FIGS. 1-4C), some components appear shaded out in some figures but not others. If a component is shaded out, it means that component plays no part in the call flow of the specific 911 call scenario being described in that figure.

FIG. 1 illustrates the various components of a Legacy 911 and NG-911 network topology 100 according to an embodiment. The components shown may be used in one or more of the 911 call scenarios depicted in FIGS. 1A-4C. It should be noted that the VSP "call server" referenced in the industry's NENA i2 specification, for purposes of this specification, may be (i) a SIP call server 104 within the TSP network or (ii) the ESRP call server 125 within the ESINet 120 itself. That is, if the TSP egresses its emergency 911 traffic as a VSP, the SIP call server 104 is within the TSP infrastructure. However, if the TSP egresses its emergency 911 traffic via TDM trunks, the traffic is converted to VoIP at the LNG 124 within the ESINet 120 and the first VoIP call server that becomes involved in the call routing is the ESRP call server 125 within the ESINet 120. Both of these configurations are supported in the general solution. All TSPs are converting legacy TDM PSTN infrastructure to "all-IP". The techniques described herein accommodate the "before" and "after" state of this conversion. Moreover, the use of either of these techniques does not require new equipment at the TSP or within the ESINet 120.

When the TSP is a legacy TDM system, the legacy TDM switch(es) 102 within the TSP passes the 911 call to the legacy network gateway (LNG) 124 within the ESINet 120. The LNG 124 converts the 9-1-1 call from TDM to VoIP and passes the media and other information (e.g., endpoint location, PSAP routing data) to the ESRP call server 125. The TDM switch(es) 102 communicates over a signaling channel to obtain the endpoint location information for the end user device that is placing the 911 call and the PSAP routing data. This information is stored in a server called a location information server (LIS) and is managed by a 911 service provider. The LIS looks up the known location of the endpoint making the call and returns that information along with the proper PSAP to route the call to back to the TDM switch 102. This data is then included with the call as it is routed from the TDM switch 102 to the LNG 124. From here, the call is passed to the ESRP call server 125 for delivery to the proper PSAP 136, 138, 140. If the proper PSAP 140 is a legacy circuit-switched PSAP, the call is sent from the ESRP call server 125 to legacy PSAP gateway (LPG) 132 for conversion back to TDM from VoIP. If the proper PSAP 138, 140 is not PIDF-Lo enabled, the PSAP 138, 140 does an ALI lookup into an ALI DB 152 within the legacy emergency infrastructure 144. The ALI DB 152 has an E2 interface connection with the LIS 116 within the 911 service provider's hybridized i2/i3 emergency infrastructure 108 to obtain/verify the location information for the call.

When the TSP is VoIP based, the SIP call server 104, depending on the implementation, may pass a media stream directly to the SBC 128 within the ESINet 120 or to the VPC 112 within the 911 service provider's hybridized i2/i3 emergency infrastructure 108. Either way, the media stream eventually hits the SBC 128. From here (as above), the call is passed to the ESRP call server 125 for delivery to the proper PSAP 136, 138, 140. If the proper PSAP is a legacy circuit-switched PSAP 140, the call is sent from the ESRP call server 125 to legacy PSAP gateway (LPG) 132 for conversion to TDM from VoIP. If the PSAP 138, 140 is not PIDF-Lo enabled, the PSAP 138, 140 does an ALI lookup into an ALI DB 152 within the legacy emergency infrastructure 144. The ALI DB 152 has an E2 interface connection with the LIS 116 within the 911 service provider's hybridized i2/i3 emergency infrastructure 108 to obtain/verify the location information for the call.

The 911 service provider hybridized i2/i3 emergency infrastructure 108 serves multiple functions. At its core it handles 911 call routing on behalf of the TSP and the TSP's customers. Thus the hybridized i2/i3 emergency infrastructure 108 keeps and maintains a database of PSAP capabilities and routes 911 calls accordingly. PSAP capabilities include the type of facilities used to deliver a 911 call to the PSAP (i.e., VoIP vs. TDM vs. wireless), the specific format of address information compatible with the PSAP call taker's display, the types of Class of Service that are able to be utilized by the PSAP call taker's equipment, and the types of location data such as latitude, longitude, confidence, uncertainty, and height. Generally speaking, a PSAP may be TDM legacy 140, i2 IP enabled (no PIDF-Lo capability) 138, or i3 IP enabled (PIDF-Lo enabled) 136. The hybridized i2/i3 emergency infrastructure 108 also knows the capabilities for each PSAP meaning what information can be displayed at the PSAP and how. The hybridized i2/i3 emergency infrastructure 108 further keeps track of trunks and trunk based routing to perform SIP routing to PSAP endpoints.

The hybridized i2/i3 emergency infrastructure 108 may comprise a VoIP position center (VPC) 112 a location information server (LIS) 116, and a PSAP database 118. The VPC 112 functions to provide routing information in support of the routing of VoIP 911 calls. The VPC 112 further cooperates in delivering location information to the PSAP using the existing legacy ALI database infrastructure 144. The VPC 112 also supports access to the routing data in the ERDB. The LIS 116 functions to store location information for each telephone number and make that information available at the time of call setup. A TSP will load or provision the LIS 116 with telephone numbers and associated civic address locations. Each civic address may be geocoded and a destination PSAP may be determined as a result.

In a pure legacy 911 system (e.g., no ESINet 120), one or more selective routers (SRs) 148 may be utilized. However, in the embodiments described herein, the ESINet 120 is VoIP based thereby eliminating the SR 148 functionality.

FIGS. 1A-2C describe various scenarios of "in call flow" signaling while FIGS. 3A-4C describe various scenarios of "out of call flow" signaling.

Figure 1A:
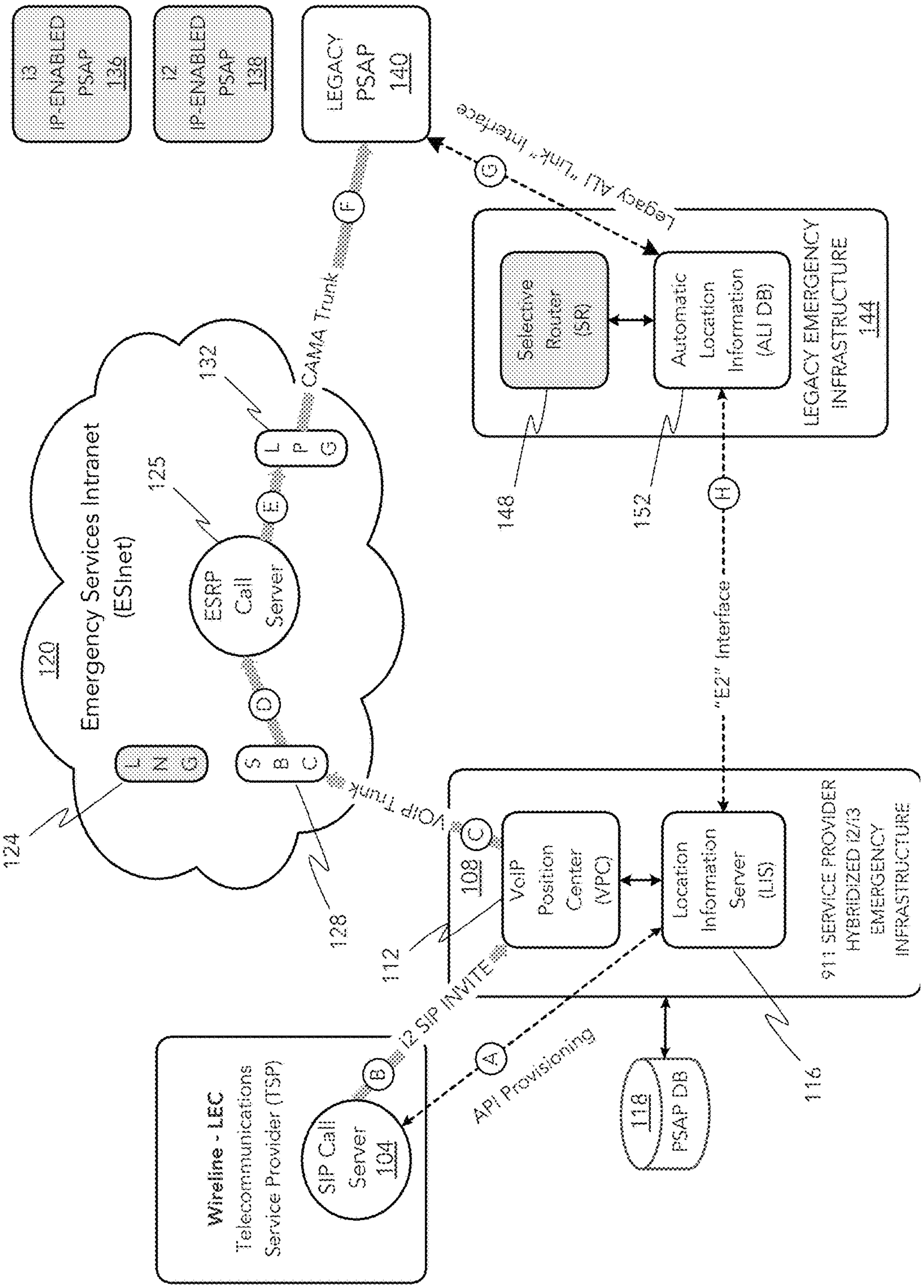
FIG. 1A illustrates a first 911 call routing scenario within the Legacy to NG-911 network topology according to an embodiment.

FIG. 1A illustrates a first 911 call routing scenario within the Legacy to NG-911 network topology according to an embodiment. In this scenario, the TSP is VoIP based and includes its own SIP call server 104 but the PSAP is a legacy PSAP 140. Moreover, the signaling is carried out in the call flow. The basic call routing of this scenario has the call originating from an endpoint served by a VoIP TSP and handled by SIP call server 104. The 911 call is forwarded to a 911 service provider's emergency infrastructure 108 that forwards to the ESINet 120 for delivery to the legacy PSAP 140.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be a legacy PSAP 140 served by an ESINet 120. The LIS 116/VPC 112 combination comprising the hybridized i2/i3 emergency infrastructure 108 for a 911 service provider determines and stores the following information for this TN: its x/y coordinates, a pool of ESLKs associated with this PSAP 140, an SBC 128 associated with this PSAP 140, a civic address, and an MSAG address. It is also assumed the legacy PSAP 140 is communicable with the ESINet 120 via a legacy PSAP gateway (LPG) 132. In addition, the 911 service provider's emergency infrastructure 108 has provisioned ESLK shell records within the legacy emergency infrastructure 144 ALI DB 152 and the ESRP server 125 maintains an ESLK routing table capable of translating an ESLK to a destination PSAP 140.

With the above in mind, the actual call flow proceeds thusly. As represented by the arrow labeled "B", a 911 call is made by the TN provisioned by dotted arrow "A" above. The TSP SIP call server 104 processes the call by sending a SIP INVITE populated with TN to the VPC 112 within the 911 service provider's hybridized i2/i3 emergency infrastructure 108. The VPC 112 receives the SIP INVITE and looks up the provisioned information for this TN within the LIS 116 where it may be determined the 911 call needs to be directed to an ESINet 120 that includes a network edge SBC 128.

Referring to arrow "C", the call is processed and a SIP INVITE is subsequently sent to the SBC 128. The SIP INVITE includes the normal parameters as well as the SBC address previously stored for this TN and a specific ESLK from the pool associated with the destination PSAP 140.

Referring to arrow "D", the SBC 128 routes the 911 call to the ESRP call server 125 for processing.

Referring to arrow "E", the ESRP call server 125 looks up the ESLK in a routing table to find the destination PSAP. In this case the destination PSAP 140 is accessed via a Legacy PSAP Gateway (LPG) 132. The ESRP call server 125 then delivers the 911 call to the LPG 132. There may be more ESRP call server's between the initial ESRP call server 125 and LPG 132, each of which will be required to perform the PSAP routing based on ESLK information.

Referring to arrow "F", the LPG 132 converts the 911 SIP call (back) to TDM and routes it over a legacy trunk (typically CAMA) to the legacy PSAP 140. The ESLK is presented as the calling party number to the PSAP 140.

Referring to dotted arrow "G", the legacy PSAP 140 processes the call and requests an "ALI Spill" from the legacy ALI DB 152. The legacy PSAP 140 does not know if the calling party number contains a TN, an ESLK, or other form of shell record.

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to the legacy PSAP 140.

Despite the ESINet 120 delivering the 911 call to the PSAP 140, the PSAP 140 still queries the ALI DB 152 for the desired MSAG address. The use of LPG 132 technology does not provide for a location object (LO) to be delivered to the PSAP 140 in any way other than a legacy ALI query (i.e., dotted arrow "G"). A key aspect for the 911 service provider 108 is to identify when a civic address geo-codes to an ESINet 120 and to record the appropriate SBC 128 address to access that ESINet 120.

Figure 1B:
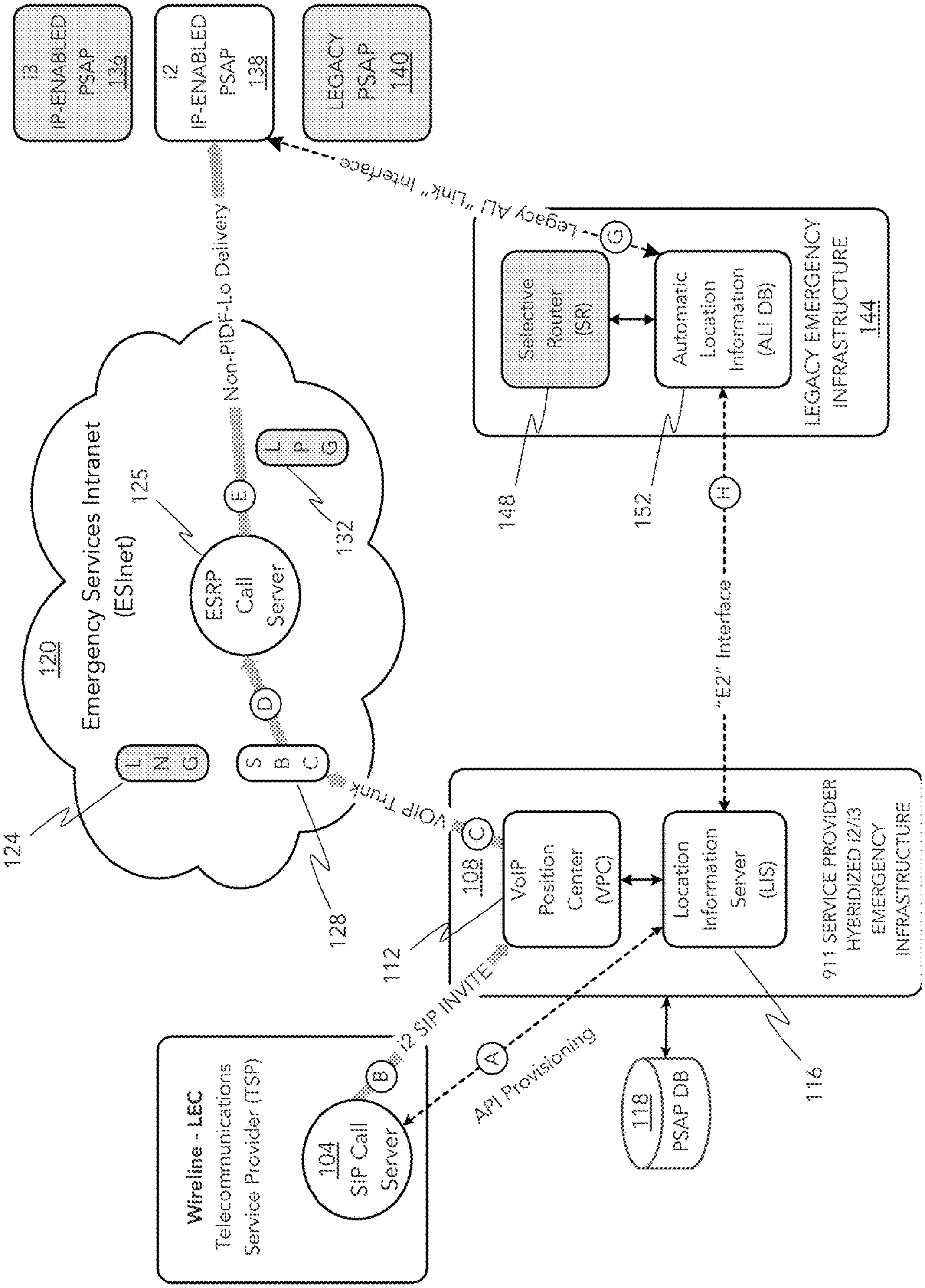
FIG. 1B illustrates a second 911 call routing scenario within the Legacy to NG-911 network topology according to an embodiment.

FIG. 1B illustrates a second 911 call routing scenario within the Legacy to NG-911 network topology according to an embodiment. In this scenario, the TSP is VoIP based and includes its own SIP call server 104 and the PSAP 138 is also VoIP based (IP enabled) but cannot yet process location objects (LOs). Moreover, the signaling is also carried out in the call flow as in FIG. 1A. The basic call routing of this scenario has the call originating from an endpoint served by a VoIP TSP and handled by SIP call server 104. The 911 call is forwarded to a 911 service provider's emergency infrastructure 108 that forwards to the ESINet 120 for delivery to the IP enabled PSAP 138.

The same assumptions as to prior provisioning of data described for FIG. 1A apply to FIG. 1B too and are not repeated. With that in mind, the actual call flow proceeds thusly. The following labeled dotted arrows and other labeled arrows operate as described previously with respect to FIG. 1A: dotted arrow "A", arrow "B", arrow "C", and arrow "D". This time the destination PSAP 138 is IP enabled but cannot yet process location objects (LOs). Thus, there is no need to convert the 911 call back to TDM meaning the LPG 132 is not needed.

Rather, the ESRP call server 125 looks up the ESLK in a routing table to determine the destination PSAP. The ESRP call server 125 proceeds with call setup to the User Agent (UA) within PSAP 138 using the ESLK as the calling party number. But, because PSAP 138 cannot process LOs, the PSAP 138 requests an "ALI Spill" from the legacy ALI DB 152 as represented by dotted arrow "G".

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to the IP enabled PSAP 138. As with the scenario in FIG. 1A, the ALI DB 152 is involved solely to deliver MSAG location data across the legacy "ALI Spill" link of dotted arrow "G".

Figure 1C:
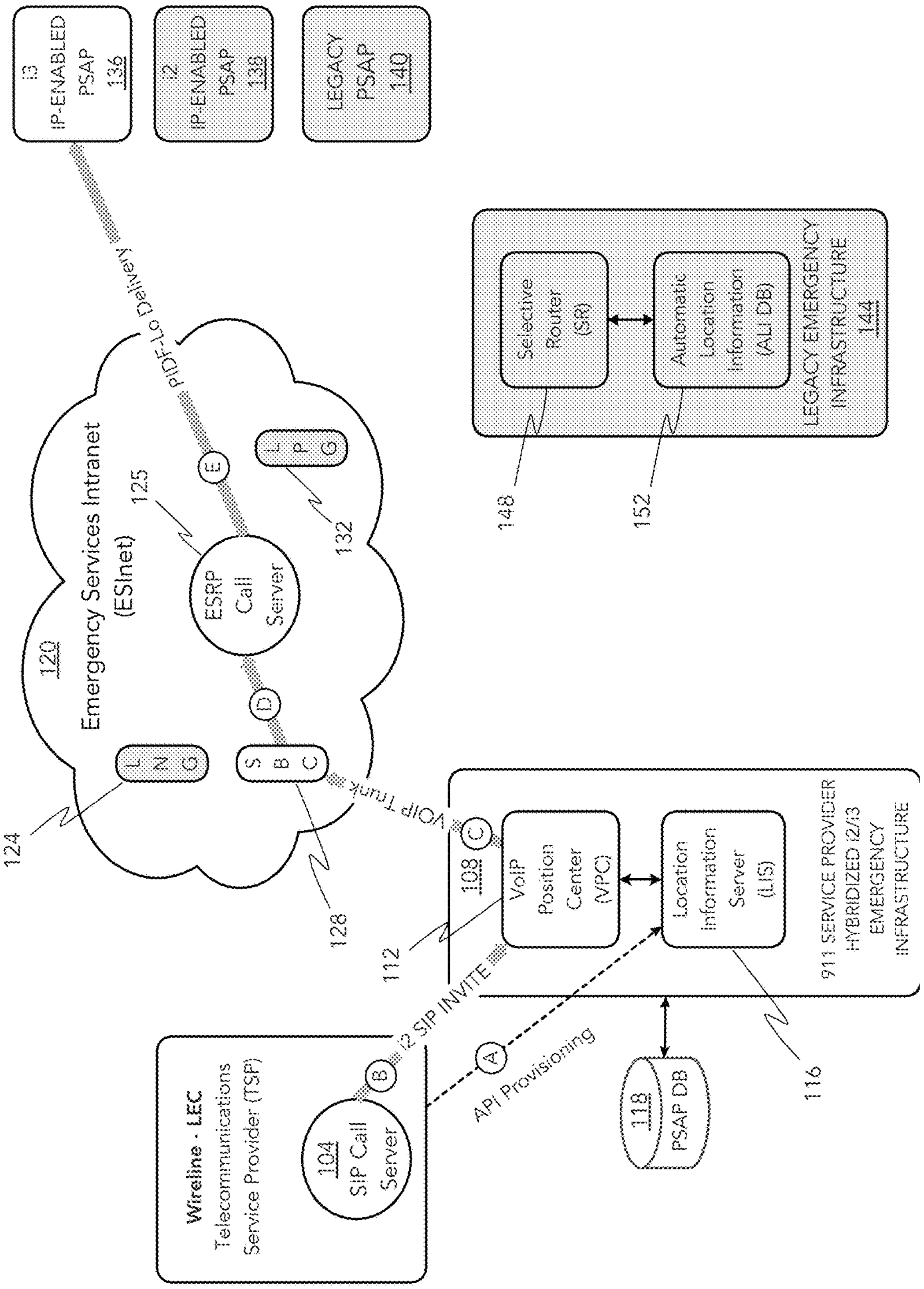
FIG. 1C illustrates a third 911 call routing scenario within the Legacy to NG-911 network topology according to an embodiment.

FIG. 1C illustrates a third 911 call routing scenario within the Legacy to NG-911 network topology according to an embodiment. In this scenario, the TSP is VoIP based and includes its own SIP call server 104 and the PSAP 136 is VoIP based and fully i3 compliant and capable of processing PIDF-Lo(s). Moreover, the signaling is also carried out in the call flow as in FIGS. 1A and 1B. The basic call routing of this scenario has the call originating from an endpoint served by a VoIP TSP and handled by SIP call server 104. The 911 call is forwarded to a 911 service provider's emergency infrastructure 108 that forwards to the ESINet 120 for delivery to the PIDF-Lo enabled PSAP 136.

The same assumptions as to prior provisioning of data described for FIG. 1A apply to FIG. 1B too and are not repeated with the exception that ESLK data is not needed. Instead, the call will be routed using the PIDF-Lo object. With that in mind, the actual call flow proceeds thusly. Dotted arrow "A" and arrow "B" operate as described previously with respect to FIG. 1A. Referring to arrow "C", the emergency call is processed and a SIP INVITE is created and populated with the actual SIP PIDF-Lo object rather than the legacy ESLK. Referring to arrow "D", the SBC 128 routes the 911 call to the ESRP call server 125 for processing based on the PIDF-Lo and routes the call to the proper fully IP enabled PSAP.

This time the destination PSAP 136 is fully IP and PIDF-Lo enabled. Thus, there is no need to convert the 911 call back to TDM meaning the LPG 132 is not needed. Nor is there a need to perform an ALI spill since the location object is contained in the call flow and can be discerned by the fully i3 compliant PSAP 136. Rather, according to arrow "E", the 911 call is delivered directly to the fully i3 compliant PSAP 136.

Figure 2A:
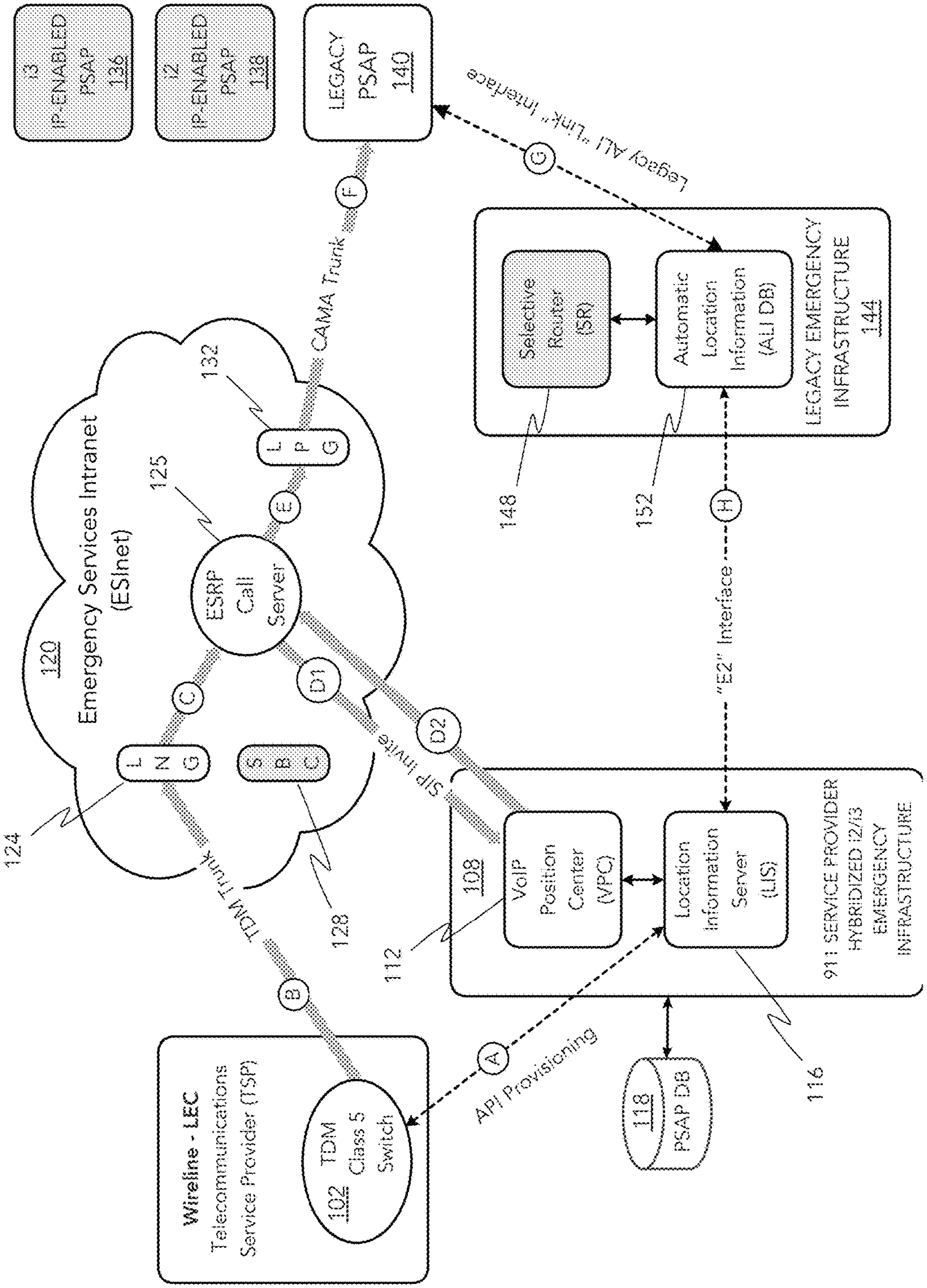
FIG. 2A illustrates a fourth 911 call routing scenario within the Legacy to NG-911 network topology according to an embodiment.

FIG. 2A illustrates a fourth 911 call routing scenario within the Legacy to NG-911 network topology according to an embodiment. In this scenario, the TSP is circuit-switched and includes TDM switch(es) 102 and the PSAP is also a legacy circuit-switched PSAP 140. Moreover, the signaling is carried out in the call flow. The intervening 911 network infrastructure, however, is VoIP based. The basic call routing of this scenario has the call originating from an endpoint served by a circuit-switched TSP and handled by TDM switch(es) 102. The 911 call is forwarded to the ESINet 120 by way of a legacy network gateway (LNG) 124 for delivery to the legacy PSAP 140 via a legacy PSAP gateway (LPG) 132.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be a legacy PSAP 140 served by an ESINet 120. The LIS 116/VPC 112 combination comprising the hybridized i2/i3 emergency infrastructure 108 for a 911 service provider determines and stores the following information for this TN: its x/y coordinates, a pool of ESLKs associated with this PSAP 140, an SBC 128 associated with this PSAP 140, a civic address, and an MSAG address. It is also assumed the legacy PSAP 140 is communicable with the ESINet 120 via a legacy PSAP gateway (LPG) 132. In addition, the 911 service provider's emergency infrastructure 108 has provisioned ESLK shell records within the legacy emergency infrastructure 144 ALI DB 152. The ESRP server 125 includes a mechanism to identify that all traffic coming from the circuit-switched TSP's TDM trunk needs to be directed to the 911 service provider emergency infrastructure 108. However, the LNG 124 may receive traffic from multiple TSPs. The ESRP server 125 must determine that a particular TN is to be processed the by the proper 911 service provider emergency infrastructure 108 VPC 112 while another call (coming from a wireless carrier, for example) does not. To overcome this, it is assumed the LNG 124 uses a specific unique IP source address for the incoming TDM trunk group that the ESRP server 125 can subsequently recognize or otherwise includes a trunk group identifier in its SIP signaling. Lastly, the ESRP server 125 maintains an ESLK routing table capable of translating an ESLK to a destination PSAP 140.

With the above in mind, the actual call flow proceeds thusly. As represented by the arrow labeled "B", when a 911 call is made from a customer of the circuit-switched TSP, the TDM Switch 102 processes the call by sending it to the ESINet 120 on a TDM trunk terminating at the Legacy Network Gateway (LNG) 124. The 911 call is identified by the TN in the calling party number.

Referring to the arrow labeled "C", the LNG 124 converts the call to IP based VoIP and passes a SIP INVITE (populated with TN in the calling party number) to the ESRP server 125 for routing.

Referring to the arrows labeled "D1" and "D2", the ESRP server 125 recognizes that all traffic associated with the incoming TDM trunk is legacy wireline traffic and it processes this traffic by sending the SIP INVITE to the VPC 112/LIS 116 of the 911 service provider emergency infrastructure 108 associated with this TDM trunk. The 911 service provider emergency VPC 116 receives the SIP INVITE and looks up the provisioned information for this TN. It is determined that routing information in the form of an ESLK needs to be provided. A SIP INVITE is sent back to the ESRP server 125 with a specific ESLK from the pool associated with the destination legacy PSAP 140.

Referring to the arrow labeled "E", the ESRP server 125 looks up the ESLK in a routing table to find the destination PSAP 140. In this case the destination PSAP 140 is accessed via a Legacy PSAP Gateway (LPG) 132. The ESRP server 125 identifies the "next hop" and delivers the 911 call to LPG 132. There may be more ESRP servers between the initial ESRP server 125 and LPG 132, each of which will be required to perform the i2 routing based on ESLK information.

Referring to arrow "F", the LPG 132 converts the 911 SIP call (back) to TDM and routes it over a legacy trunk (typically CAMA) to the legacy PSAP 140. The ESLK is presented as the calling party number to the PSAP 140.

Referring to dotted arrow "G", the legacy PSAP 140 processes the call and requests an "ALI Spill" from the legacy ALI DB 152. The legacy PSAP 140 does not know if the calling party number contains a TN, an ESLK, or other form of shell record.

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to the legacy PSAP 140.

Despite the ESINet 120 delivering the 911 call to the PSAP 140, the PSAP 140 still queries the ALI DB 152 for the desired MSAG address. The use of LPG 132 technology does not provide for a location object (LO) to be delivered to the PSAP 140 in any way other than a legacy ALI query (i.e., dotted arrow "G"). A key aspect for the 911 service provider 108 is to identify when a civic address geo-codes to an ESINet 120 and to record the appropriate SBC 128 address to access that ESINet 120.

Figure 2B:
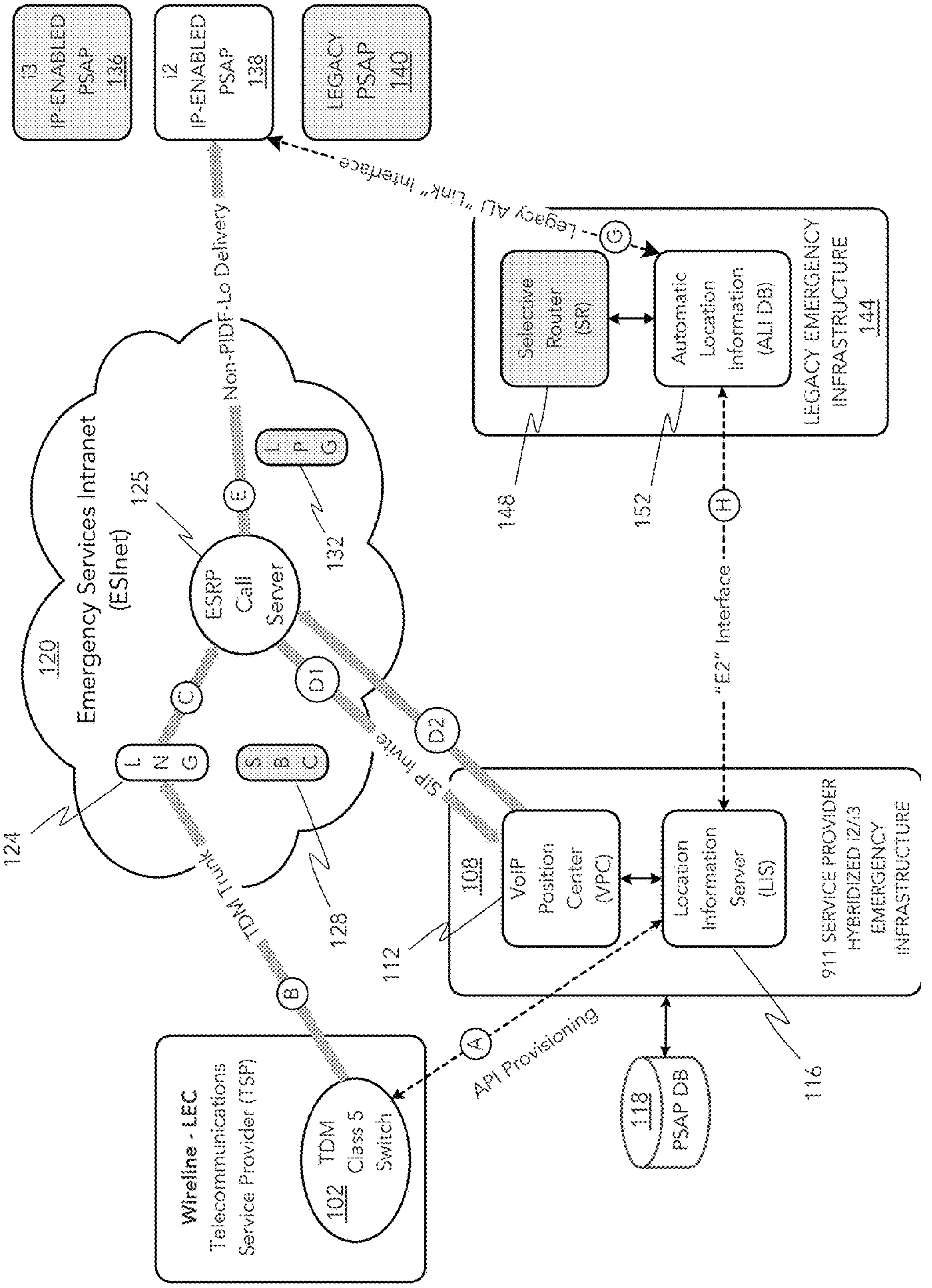
FIG. 2B illustrates a fifth 911 call routing scenario within the Legacy to NG-911 network topology according to an embodiment.

FIG. 2B illustrates a fifth 911 call routing scenario within the Legacy to NG-911 network topology according to an embodiment. In this scenario, the TSP is circuit-switched and includes TDM switch(es) 102 and the PSAP 138 is VoIP based (IP enabled) but cannot yet process location objects (LOs). Moreover, the signaling is carried out in the call flow. The intervening 911 network infrastructure is also VoIP based. The basic call routing of this scenario has the call originating from an endpoint served by a circuit-switched TSP and handled by TDM switch(es) 102. The 911 call is forwarded to the ESINet 120 by way of LNG 124 for delivery to the IP enabled PSAP 138.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be a transitional IP PSAP 138 served by an ESINet 120. The LIS 116/VPC 112 combination comprising the hybridized i2/i3 emergency infrastructure 108 for a 911 service provider determines and stores the following information for this TN: its x/y coordinates, a pool of ESLKs associated with this PSAP 140, an SBC 128 associated with this PSAP 138, a civic address, and an MSAG address. In addition, the 911 service provider's emergency infrastructure 108 has provisioned ESLK shell records within the legacy emergency infrastructure 144 ALI DB 152. The ESRP server 125 includes a mechanism to identify that all traffic coming from the circuit-switched TSP's TDM trunk needs to be directed to the 911 service provider emergency infrastructure 108. However, the LNG 124 may receive traffic from multiple TSPs. The ESRP server 125 must determine that a particular TN is to be processed the by the proper 911 service provider emergency infrastructure 108 VPC 112 while another call (coming from a wireless carrier, for example) does not. To overcome this, it is assumed the LNG 124 uses a specific unique IP source address for the incoming TDM trunk group that the ESRP server 125 can subsequently recognize or otherwise includes a trunk group identifier in its SIP signaling. Lastly, the ESRP server 125 maintains an ESLK routing table capable of translating an ESLK to the destination PSAP 138.

With that in mind, the actual call flow proceeds thusly. The following labeled dotted arrows and other labeled arrows operate as described previously with respect to FIG. 2A: dotted arrow "A", arrow "B", arrow "C", and arrows "D1" and "D2". This time the destination PSAP 138 is transitionally IP enabled but cannot yet process location objects (LOs). Thus, there is no need to convert the 911 call back to TDM meaning the LPG 132 is not needed.

Referring to arrow "E", the ESRP server 125 looks up the ESLK in a routing table to find the destination PSAP 138. In this case the destination PSAP 138 is SIP capable, but not location object (LO) capable. The ESRP server 125 proceeds with call setup to the User Agent (UA) within PSAP 138 using the ESLK as the calling party number. But, because PSAP 138 cannot process LOs, the PSAP 138 requests an "ALI Spill" from the legacy ALI DB 152 as represented by dotted arrow "G".

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to the IP enabled PSAP 138. As with the scenario in FIG. 1A, the ALI DB 152 is involved solely to deliver MSAG location data across the legacy "ALI Spill" link of dotted arrow "G".

Figure 2C:
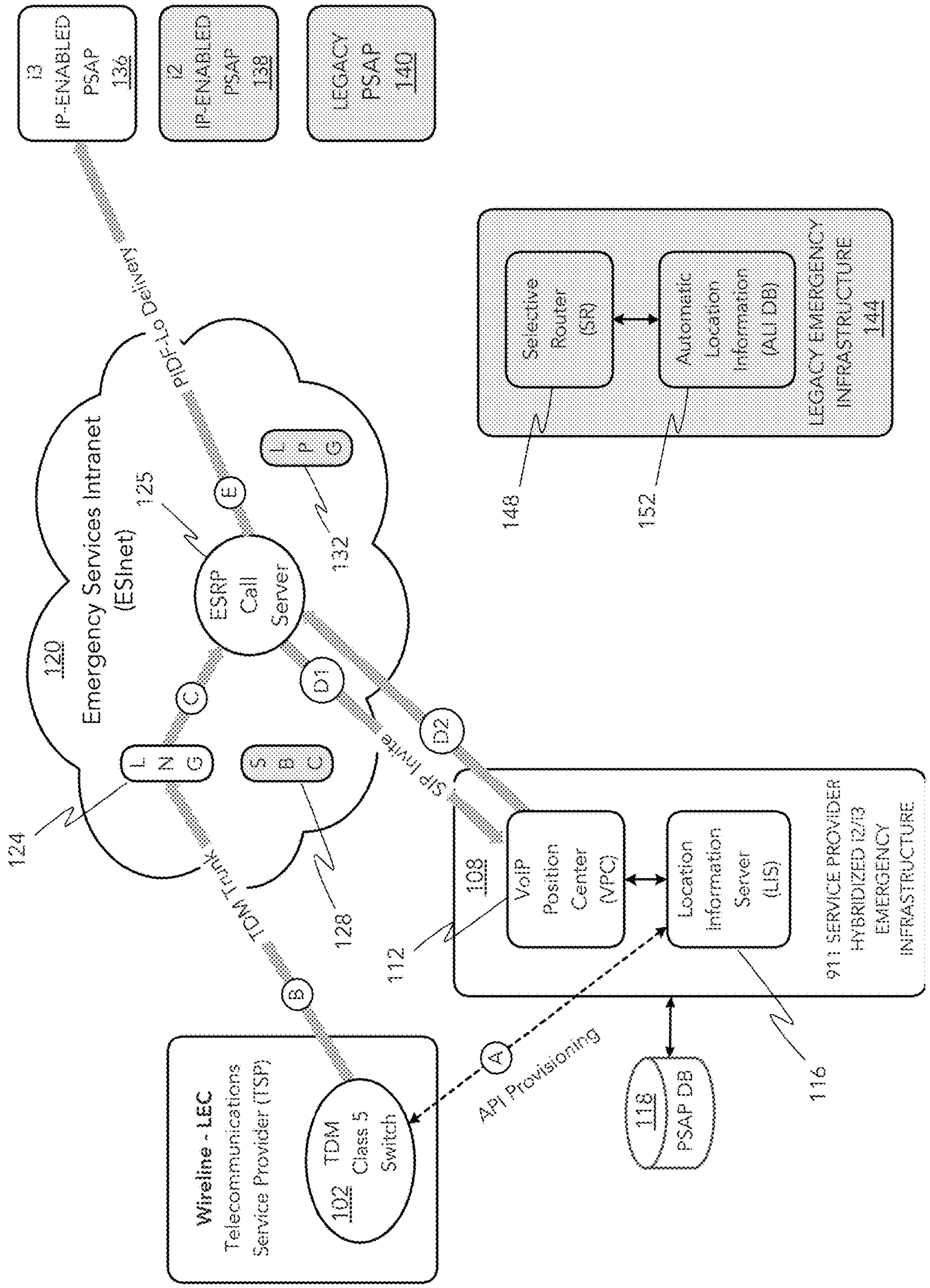
FIG. 2C illustrates a sixth 911 call routing scenario within the Legacy to NG-911 network topology according to an embodiment.

FIG. 2C illustrates a sixth 911 call routing scenario within the Legacy to NG-911 network topology according to an embodiment. In this scenario, the TSP is circuit-switched and includes TDM switch(es) 102 and the PSAP 136 is VoIP based (IP enabled and PIDF-Lo enabled) and can process location objects (LOs). Moreover, the signaling is carried out in the call flow. The intervening 911 network infrastructure is also VoIP based. The basic call routing of this scenario has the call originating from an endpoint served by a circuit-switched TSP and handled by TDM switch(es) 102. The 911 call is forwarded to the ESINet 120 by way of LNG 124 for delivery to the PIDF-Lo enabled PSAP 136.

With that in mind, the actual call flow proceeds thusly. Dotted arrow "A", arrow "B", and arrow "C" operate as described previously with respect to FIG. 2A. In this case, the SIP INVITE of arrow "D1" is altered by "D2" to include the PIDF-Lo object that gets forwarded to and used by ESRP 125.

This time the destination PSAP 136 is IP and PIDF-Lo enabled. Thus, there is no need to perform an ALI spill since the location object is contained in the call flow and can be discerned by the fully IP enabled PSAP 136. Rather, according to arrow "E", the 911 call is delivered directly to the fully IP enabled PSAP 136.

FIGS. 3A-4C are distinguished from FIGS. 1A-2C in that 911 calls are routed using out of call flow signaling as opposed to in call signaling. The out of call signaling may be achieved via a proxy redirect technique.

Figure 3A:
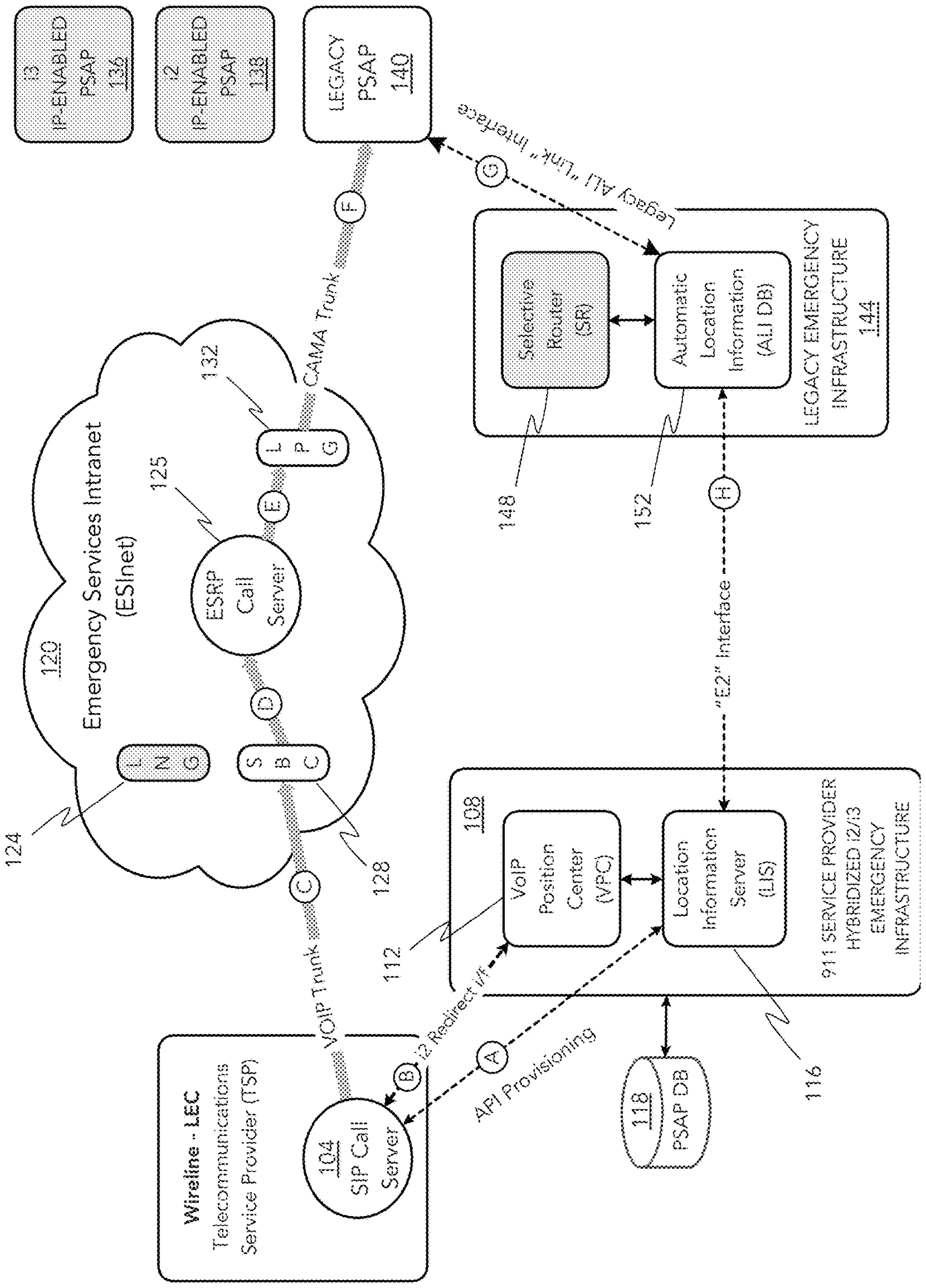
FIG. 3A illustrates a seventh 911 call routing scenario within the Legacy to NG-911 network topology according to an embodiment.

FIG. 3A illustrates a seventh 911 call routing scenario within the Legacy to NG-911 network topology according to an embodiment. In this scenario, the TSP is VoIP based and includes a SIP call server 104 and the destination PSAP is a legacy circuit-switched PSAP 140. The intervening 911 network infrastructure is VoIP based. The basic call routing of this scenario has the call originating from an endpoint served by the VoIP based TSP and handled by SIP call server 104. The 911 call is forwarded to the ESINet 120 by way of a session border controller (SBC) 128 for delivery to the legacy PSAP 140 via a legacy PSAP gateway (LPG) 132.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be a legacy PSAP 140 served by an ESINet 120. The LIS 116/VPC 112 combination comprising the hybridized i2/i3 emergency infrastructure 108 for a 911 service provider determines and stores the following information for this TN: its x/y coordinates, a pool of ESLKs associated with this PSAP 140, an SBC 128 associated with this PSAP 140, a civic address, and an MSAG address.

It is also assumed the legacy PSAP 140 is communicable with the ESINet 120 via a legacy PSAP gateway (LPG) 132. In addition, the 911 service provider's emergency infrastructure 108 has provisioned ESLK shell records within the legacy emergency infrastructure 144 ALI DB 152. The TSP SIP call server 104 must also support a SIP redirect message. It is also assumed an Emergency Services Gateway Route Identifier (ESGW-RI) can be de-referenced by the ESINet network via DNS resulting in identification of the ESRP server 125 as the destination. The ESRP server 125 does its normal job of determining the "next hop" for the call setup. In this case, the URI address of the destination LPG 132. The ESGW-RI identifiers would be defined and maintained by the ESINet 120 and shared with the 911 service provider 108 when there is traffic to terminate at a destination identified by a particular ESGW-RI that identifies the terminating ESINet 120. The ESGW-RI is normally used by a CallServer/Routing Proxy to route an emergency call to the correct ESGW. It is described herein to use this same data element to instead identify the destination ESRP server 125. The ESRP server 125 exists on an ESINet 120 with DNS capability and the DNS table requires provisioning to resolve this address. In the same way as is done by an ESGW network provider. The ESGWRI format is as follows: sip: +1 numberstring@esgwprovider.domain;user=phone where the "numberstring" is 10 numeric characters (e.g., nnnnnnnnnn). Lastly, the ESRP server 125 maintains an ESLK routing table capable of translating an ESLK to a destination PSAP.

Hence there are three new requirements. First, the VPC 112/LIS 116 must be able to populate the ESGW-RI parameter instead of the ESN parameter. Currently, the 911 service provider 108 passes an ESN parameter to the ESGW network for route determination. The ESN is a 10-digit number that is converted into a URL by the ESGW network and used to route via DNS resolution. The technique described herein passes the i2 compliant ESGW-RI to the ESINet 120 that is already in the form of a URL. An alternative solution may be to use the ESN and rely on the ESINet 120 to convert into the correct format or use another URI format that can be resolved by the ESInet.

Second, the ESINet DNS must be able to route the SIP INVITE to the ESRP server 125. Third, the ESRP server 125 must maintain a ESLK routing table and be able to translate ESLK to the destination PSAP. For clarity, the ESGW-RI indicates the destination ESINet and the ESLK indicates the destination PSAP and identifies a particular call in progress.

With the above in mind, the actual call flow proceeds thusly. As represented by the arrow labeled "B", when a 911 call is made the TSP SIP call server 104 processes the call by sending a SIP INVITE populated with TN in the same way as is done currently. The 911 service provider VPC 112 receives the SIP INVITE and looks up the provisioned information for this TN where it is determined the call needs to be directed to an "ESGW", which in this case is ESINet 120. A REDIRECT is sent back to the TSP SIP call server 104 with the normal parameters as well as the ESGW-RI previously stored for this TN and a specific ESLK from the pool associated with the destination PSAP.

Referring to arrow "C", TSP SIP call server 104 processes the REDIRECT and routes the call to the SBC 128 on the edge of the ESINet 120 where the re-issued SIP INVITE now contains the ESLK and ESGW-RI as noted above. The 911 service provider 108 is no longer in the call path following this step. The 911 service provider 108 relies on the SIP call server to send it a "call complete" message once the call has ended so that it can release the ESLK back into the pool of available ESLKs. Alternatively, the 911 service provider 108 may implement a timer to release the ESLK back into the pool for future use.

Referring to arrow "D", the ESINet's DNS service resolves the ESGW-RI (URI) and routes the SIP INVITE to the ESRP server 125 for processing.

Referring to arrow "E", the ESRP server 125 looks up the ESLK in a routing table to find the destination PSAP. In this case the destination PSAP 140 is accessed via a Legacy PSAP Gateway (LPG) 132. The ESRP server 125 identifies the "next hop" to deliver the call to the LPG 132. There may be more ESRPs between the initial ESRP server 125 and LPG 132, each of which will be required to perform the i2 routing based on ESLK information.

Referring to arrow "F", the LPG 132 converts the SIP call to TDM and routes it over a legacy trunk (typically CAMA) to the legacy PSAP 140. The ESLK is presented as the calling party number.

Referring to dotted arrow "G", the legacy PSAP 140 processes the call and requests an "ALI Spill" from the legacy ALI DB 152. The legacy PSAP 140 does not know if the calling party number contains a TN, an ESLK, or other form of shell record.

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to the legacy PSAP 140.

The use cases for FIGS. 3A-4C imply certain additions to the current VPC 112 database of the 911 service provider 108. The table below shows the additional data elements and some aspects of their use.

TABLE 2

| TN | Geo-Code Lat-Long | ESN | ESQK Pool | MSAG Address | ESGW-RI (URI) | ESLK Pool | Last Routing Option |
|---|---|---|---|---|---|---|---|
| TN-1 | X1-Y1 | | | Address-1 | URI-A | Range-A | LRO-1 |
| TN-2 | X2-Y2 | | | Address-2 | URI-A | Range-B | LRO-1 |
| TN-3 | X3-Y3 | | | Address-3 | URI-B | Range-C | LRO-2 |
| TN-4 | X4-Y4 | ESN-A | Range-D | Address-4 | | | |
| TN-5 | X5-Y5 | ESN-B | Range-E | Address-5 | | | |

The additional elements include: TN, Geo-Code Lat-Long, ESN, ESQK Pool, MSAG Address, ESGW-RI, ESLK Pool, and a Last Routing Option (LRO).

The TN is the existing 10-digit North American Numbering Plan (NANP) telephone number of a subscriber. The Geo-Code Lat-Long is the existing "X-Y" coordinates of the civic address. The ESN is the existing emergency services 10-digit number that identifies the ESGW gateway in the ESGW network that is connected to the destination selective router (SR) for a particular geo-coded TN. The ESN identifies the ESGW and SR, not the PSAP. The ESN is converted to a URL by the ESGW network and used to determine IP and route by DNS resolution. The ESQK pool is the existing range of 10-digit numbers associated with a specific PSAP. An ESQK is pulled from this pool and assigned temporarily to a 911 call to both route the call and facilitate fetching of MSAG address and call back number from the VPC 112. The MSAG address is the existing formatted address to present to the PSAP for this particular TN. The ESGW-RI is new and refers to a URL that identifies the destination ESINet 120 and resolves such that the 911 call routes to the SBC 128 at the edge of the ESINet 120 and further resolves once inside the ESINet 120 demark point to the serving ESRP server 125. The ESGW-RI identifies the ESINet 120, not the PSAP 136, 138, 140 for a call. The format of the ESGW-RI is a URL that contains a 10-digit number and other data. The ESLK pool is new and refers to the range of 10-digit numbers associated with a specific PSAP 136, 138, 140. An ESLK is pulled from this pool and assigned temporarily to a 911 call to both route the call and facilitate fetching of MSAG address and call back number from the VPC 112. There may be differences in polygon shapes for PSAPs that receive landline versus VoIP versus wireless traffic. It remains to be seen if there are any other differences that distinguish an ESLK from an ESQK. One such difference is that an LRO is associated with each ESLK pool. The last routing option (LRO) is new and refers to the 10-digit number provided to the originating VoIP/SIP Call Server 104 and is used to route the call in the case of various error conditions such as unavailability of IP connectivity to the ESGW network. The LRO is used in the i2 specification use cases that use "redirect".

For the sample table data above, the first three rows illustrate the data needed for a TSP record using the "redirect" method described in FIGS. 3A-4C. The last two rows illustrate the current data stored for a TN residing in VPC 112 from a CLEC. It can be seen that the presence or absence of various populated elements can be used to distinguish a TSP TN from a CLEC TN.

Figure 3B:
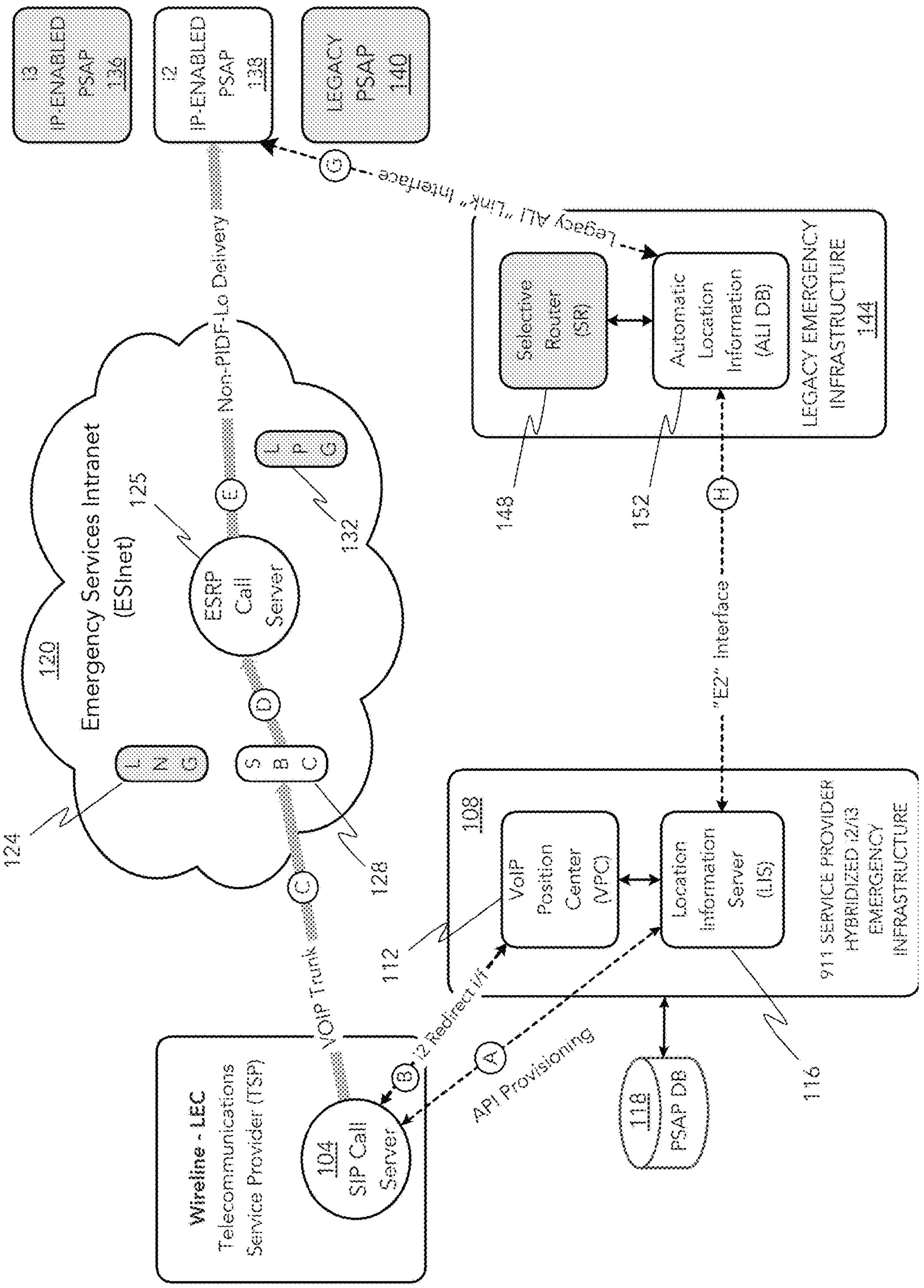
FIG. 3B illustrates a eighth 911 call routing scenario within the Legacy to NG-911 network topology according to an embodiment.

FIG. 3B illustrates an eighth 911 call routing scenario within the Legacy to NG-911 network topology according to an embodiment. In this scenario, the TSP is VoIP based and includes its own SIP call server 104 and the PSAP 138 is also VoIP based (IP enabled) but cannot yet process location objects (LOs). The intervening 911 network infrastructure is VoIP based. The basic call routing of this scenario has the call originating from an endpoint served by the VoIP based TSP and handled by SIP call server 104. The 911 call is forwarded to the ESINet 120 by way of a session border controller (SBC) 128 for delivery to the legacy PSAP 138 via the ESRP server 125.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be an IP enabled PSAP 138 served by an ESINet 120. The LIS 116/VPC 112 combination comprising the hybridized i2/i3 emergency infrastructure 108 for a 911 service provider determines and stores the following information for this TN: its x/y coordinates, a pool of ESLKs associated with this PSAP 140, an SBC 128 associated with this PSAP 138, a civic address, and an MSAG address. It is also assumed PSAP 138 is IP enabled (i.e., SIP capable) but cannot yet process location objects (LOs). This is reflective of IP enabled PSAPs today that have discarded CAMA in favor of SIP trunking, but do not support the advanced features of i3 just yet.

In addition, the 911 service provider's emergency infrastructure 108 has provisioned ESLK shell records within the legacy emergency infrastructure 144 ALI DB 152. The TSP SIP call server 104 must also support a SIP redirect message. It is also assumed an Emergency Services Gateway Route Identifier (ESGW-RI) can be de-referenced by the ESINet network via DNS resulting in identification of the ESRP server 125 as the destination. The ESRP server 125 does its normal job of determining the "next hop" for the call setup. In this case, the URI address of the destination PSAP 138, called a user agent (UA) in the i3 specification.

With the above in mind, the actual call flow proceeds thusly. The arrows labeled "A", "B", "C", and "D" function the same as described in FIG. 3A. Referring to the arrow labeled "E", the ESRP server 125 looks up the ESLK in a routing table to find the destination PSAP 138. In this case the destination PSAP is SIP capable, but not LO capable. The ESRP server 125 proceeds with call setup to the UA at PSAP 138 utilizing the ESLK as the calling party number.

Referring to dotted arrow "G", PSAP 138 processes the call and requests an "ALI Spill" from the legacy ALI DB 152. PSAP 138 does not know if the calling party number contains a TN, an ESLK, or other form of shell record.

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to PSAP 138.

Figure 3C:
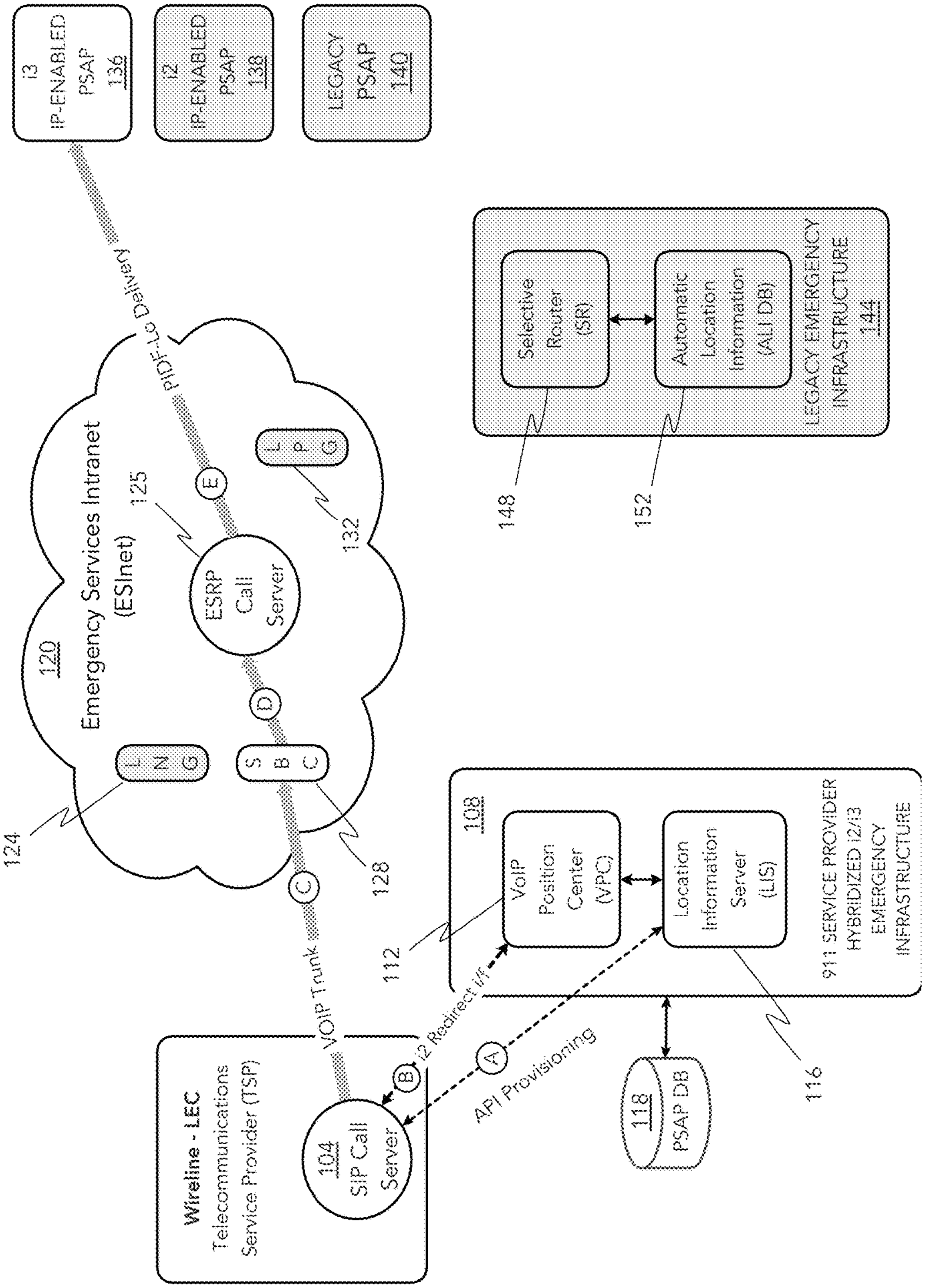
FIG. 3C illustrates a ninth 911 call routing scenario within the Legacy to NG-911 network topology according to an embodiment.

FIG. 3C illustrates a ninth 911 call routing scenario within the Legacy to NG-911 network topology according to an embodiment. In this scenario, the TSP is VoIP based and includes its own SIP call server 104 and the PSAP 136 is also VoIP based (IP enabled) and can process location objects (LOs). The intervening 911 network infrastructure is VoIP based. The basic call routing of this scenario has the call originating from an endpoint served by the VoIP based TSP and handled by SIP call server 104. The 911 call is forwarded to the ESINet 120 by way of a session border controller (SBC) 128 for delivery to the legacy PSAP 138 via the ESRP server 125.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be a fully IP enabled PSAP 136 served by an ESINet 120. The LIS 116/VPC 112 combination comprising the hybridized i2/i3 emergency infrastructure 108 for a 911 service provider determines and stores the following information for this TN: its x/y coordinates, a URI identifying the SBC 128 associated with this PSAP 136, a civic address, and an MSAG address, and, optionally, a Last Routing Option (LRO).

In addition, the TSP SIP call server 104 must also support a SIP redirect message. The ESRP server 125 does its normal job of determining the "next hop" for the call setup. In this case, the URI address of the destination PSAP 136, called a user agent (UA) in the i3 specification.

With the above in mind, the actual call flow proceeds thusly. Arrow "A" is processed as above. Referring to arrow "B" the REDIRECT message is returned and includes a PIDF-Lo to be included in the SIP INVITE associated with arrow "C". Arrow "C" passes through SBC 128 where normal de-referencing of the URI takes place. Arrow "D" also includes the PIDF-Lo that ESRP 125 uses to determine the route to the fully IP enabled PSAP 136. Because destination PSAP 136 is fully IP enabled, there is no need to perform an ALI spill since the location object is contained in the call flow and can be discerned by the fully IP enabled PSAP 136. Rather, according to arrow "E", the 911 call is delivered directly to the fully IP enabled PSAP 136.

Figure 4A:
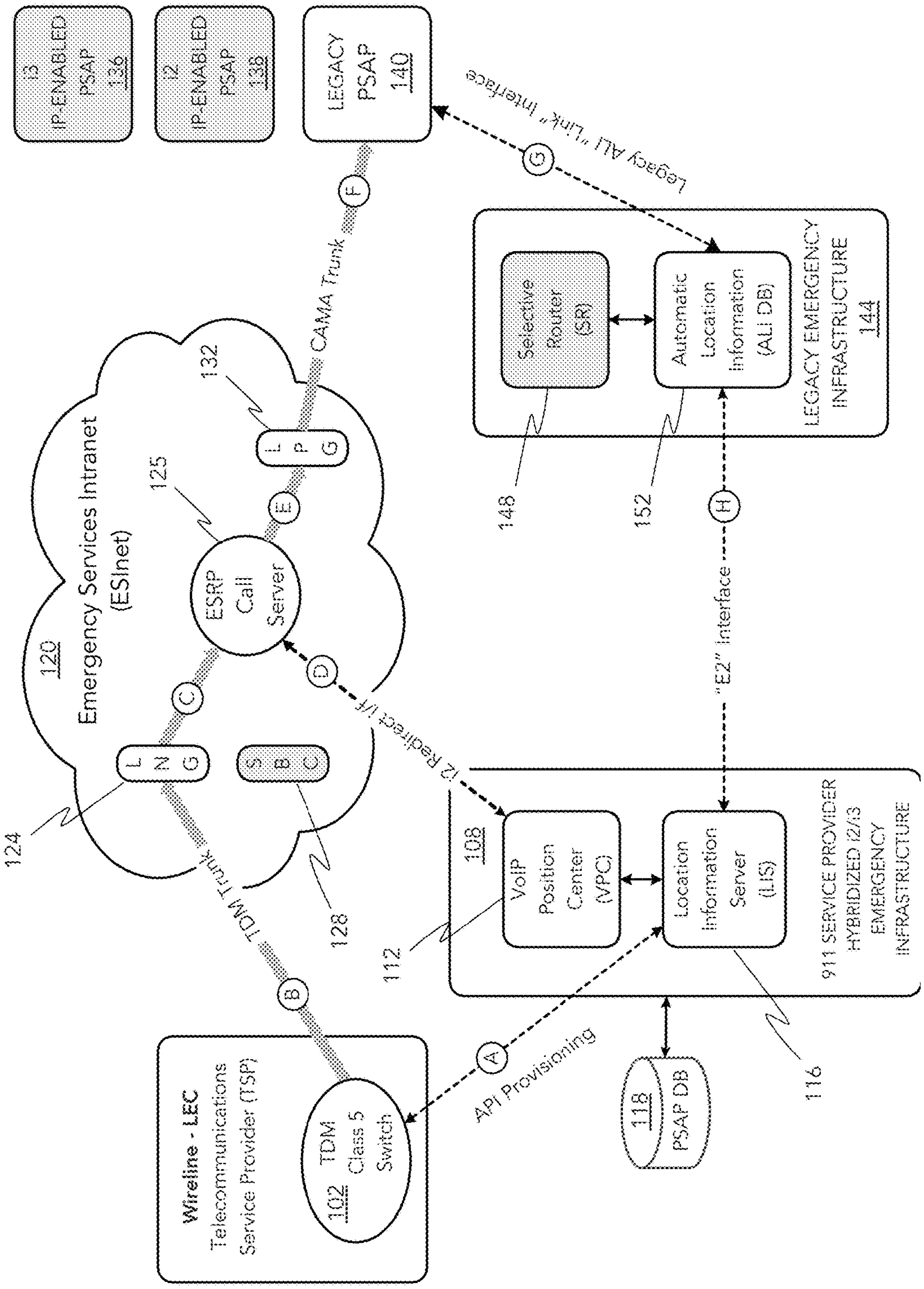
FIG. 4A illustrates a tenth 911 call routing scenario within the Legacy to NG-911 network topology according to an embodiment.

FIG. 4A illustrates a tenth 911 call routing scenario within the Legacy to NG-911 network topology according to an embodiment. In this scenario, the TSP is circuit-switched and includes TDM switch(es) 102 and the PSAP is also a legacy circuit-switched PSAP 140. The intervening 911 network infrastructure, however, is VoIP or SIP based. The basic call routing of this scenario has the call originating from an endpoint served by a circuit-switched TSP and handled by TDM switch(es) 102. The 911 call is forwarded to the ESINet 120 by way of a legacy network gateway (LNG) 124 for delivery to the legacy PSAP 140 via a legacy PSAP gateway (LPG) 132.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be a legacy PSAP 140 served by an ESINet 120. The LIS 116/VPC 112 combination comprising the hybridized i2/i3 emergency infrastructure 108 for a 911 service provider determines and stores the following information for this TN: its x/y coordinates, a pool of ESLKs associated with this PSAP 140, a civic address, and an MSAG address.

It is also assumed the legacy PSAP 140 is communicable with the ESINet 120 via a legacy PSAP gateway (LPG) 132. In addition, the 911 service provider's emergency infrastructure 108 has provisioned ESLK shell records within the legacy emergency infrastructure 144 ALI DB 152. The ESRP server 125 includes a mechanism to identify that all traffic coming from the circuit-switched TSP's TDM trunk needs to be directed to the 911 service provider emergency infrastructure 108. However, the LNG 124 may receive traffic from multiple TSPs. The ESRP server 125 must determine that a particular TN is to be processed the by the proper 911 service provider emergency infrastructure 108 VPC 112 while another call (coming from a wireless carrier, for example) does not. To overcome this, it is assumed the LNG 124 uses a specific unique IP source address for the incoming TDM trunk group that the ESRP server 125 can subsequently recognize or include a incoming Trunk Identifier in the subsequent SIP signaling. Lastly, the ESRP server 125 maintains an ESLK routing table capable of translating an ESLK to a destination PSAP 140.

With the above in mind, the actual call flow proceeds thusly. As represented by the arrow labeled "B", when a 911 call is made by the TN provisioned above, the TDM switch 102 processes the call by sending it to the ESINet 120 on a TDM trunk terminating at the LNG 124. The call is identified by the TN in the calling party number.

Referring to arrow "C", the LNG 124 converts the call to VoIP and passes the SIP INVITE populated with TN in the calling party number to the ESRP server 125 for routing.

Referring to arrow "D", the ESRP server 125 recognizes that all traffic associated with the incoming TDM trunk is legacy wireline traffic and processes this traffic by sending the SIP INVITE to the VPC 112/LIS 116 associated with this trunk. Next, the VPC 112 service receives the SIP INVITE and looks up the provisioned information for this TN. It is determined that routing information in the form of an ESLK needs to be provided. A redirect is sent back to the ESRP server 125 with a specific ESLK from the pool associated with the destination PSAP 140.

Referring to arrow "E", the ESRP server 125 looks up the ESLK in a routing table to find the destination PSAP 140. In this case the destination PSAP is accessed via LPG 132. ESRP server 125 identifies the "next hop" to deliver the call to the LPG 132. There may be more ESRPs between the initial ESRP and LPG, each of which will be required to perform the i2 routing based on ESLK information.

Referring to arrow "F", the LPG 132 converts the SIP call back to TDM and routes it over a legacy trunk (typically CAMA) to the legacy PSAP 140. The ESLK is presented as the calling party number.

Referring to dotted arrow "G", PSAP 140 processes the call and requests an "ALI Spill" from the legacy ALI DB 152. PSAP 140 does not know if the calling party number contains a TN, an ESLK, or other form of shell record.

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to PSAP 140.

Figure 4B:
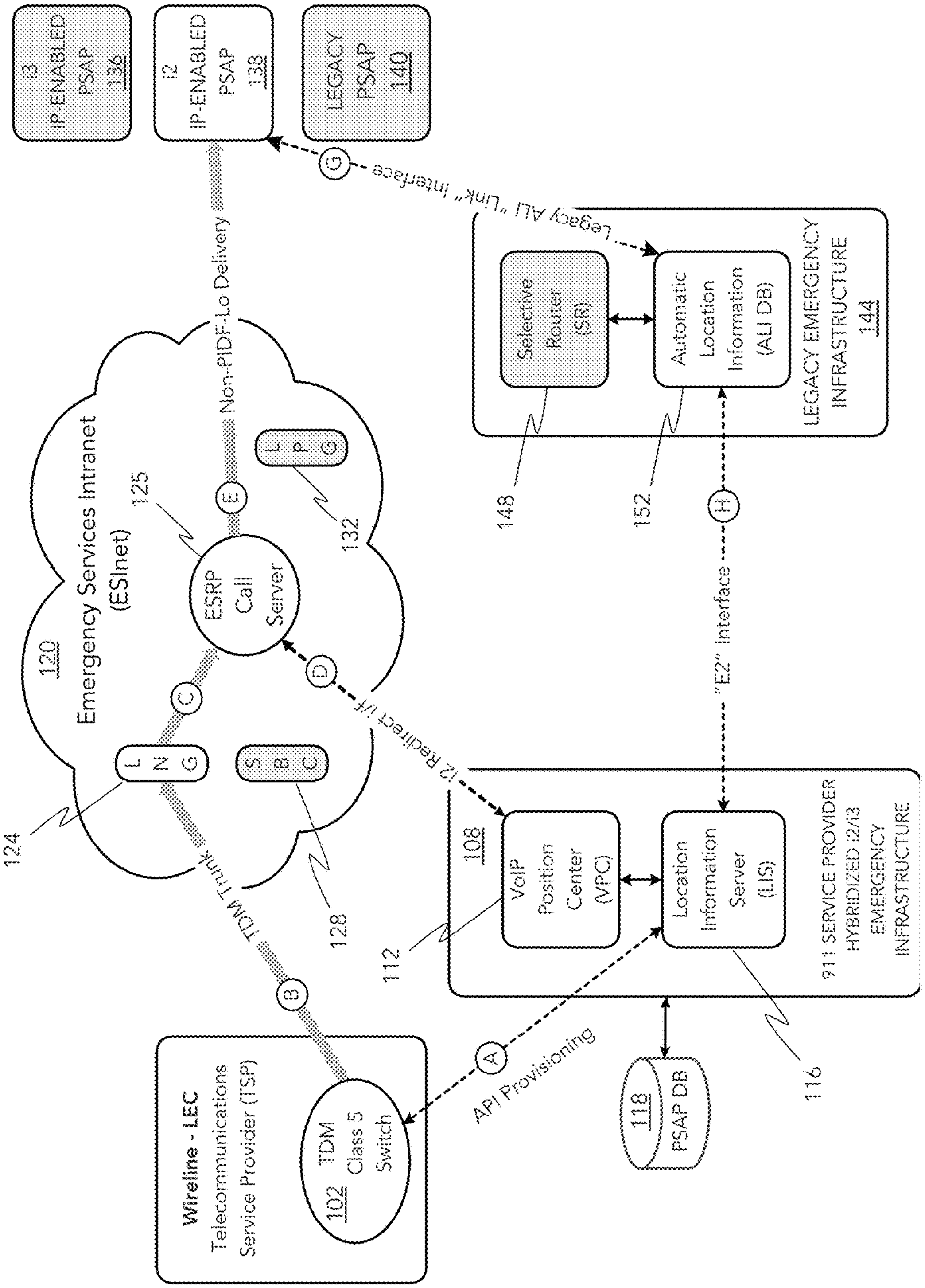
FIG. 4B illustrates a eleventh 911 call routing scenario within the Legacy to NG-911 network topology according to an embodiment.

FIG. 4B illustrates a eleventh 911 call routing scenario within the Legacy to NG-911 network topology according to an embodiment. In this scenario, the TSP is circuit-switched and includes TDM switch(es) 102 and the PSAP is an IP enabled PSAP 138. The intervening 911 network infrastructure is VoIP or SIP based like PSAP 138. The basic call routing of this scenario has the call originating from an endpoint served by a circuit-switched TSP and handled by TDM switch(es) 102. The 911 call is forwarded to the ESINet 120 by way of a legacy network gateway (LNG) 124 for delivery to IP enabled PSAP 138.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be an IP enabled PSAP 138 served by an ESINet 120. The LIS 116/VPC 112 combination comprising the hybridized i2/i3 emergency infrastructure 108 for a 911 service provider determines and stores the following information for this TN: its x/y coordinates, a pool of ESLKs associated with this PSAP 138, a civic address, and an MSAG address.

It is also assumed PSAP 138 is IP enabled but not SIP PIDF-Lo (location object) capable yet. In addition, the 911 service provider's emergency infrastructure 108 has provisioned ESLK shell records within the legacy emergency infrastructure 144 ALI DB 152. The ESRP server 125 can support and process a SIP redirect message. The ESRP server 125 includes a mechanism to identify that all traffic coming from the circuit-switched TSP's TDM trunk needs to be directed to the 911 service provider emergency infrastructure 108. However, the LNG 124 may receive traffic from multiple TSPs. The ESRP server 125 must determine that a particular TN is to be processed the proper 911 service provider emergency infrastructure 108 VPC 112 while another call (coming from a wireless carrier, for example) does not. To overcome this, it is assumed the LNG 124 uses a specific unique IP source address for the incoming TDM trunk group that the ESRP server 125 can subsequently recognize or include a incoming Trunk Identifier in the subsequent SIP signaling. Lastly, the ESRP server 125 maintains an ESLK routing table capable of translating an ESLK to a destination PSAP 140.

With the above in mind, the actual call flow proceeds thusly. The arrows labeled "A", "B", "C", and "D" function the same as described in FIG. 4A. Referring to the arrow labeled "E", the ESRP server 125 looks up the ESLK in a routing table to find the destination PSAP 138. In this case the destination PSAP is SIP capable, but not PIDF-Lo capable. The ESRP server 125 proceeds with call setup to the UA at PSAP 138 utilizing the ESLK as the calling party number.

Referring to dotted arrow "G", PSAP 138 processes the call and requests an "ALI Spill" from the legacy ALI DB 152. PSAP 138 does not know if the calling party number contains a TN, an ESLK, or other form of shell record.

Referring to dotted arrow "H", the legacy ALI DB 152 receives the request for location data associated with the ESLK. The ALI DB 152 looks up the record and observes both the stored "class of service" for this shell record and the 911 service provider 108 to query for location. In this case the shell record points to the LIS 116 for the 911 service provider 108 which fulfills the query by returning the previously stored MSAG address for the TN that originated the 911 call. The ALI DB 152, in turn, relays this data to PSAP 138.

Figure 4C:
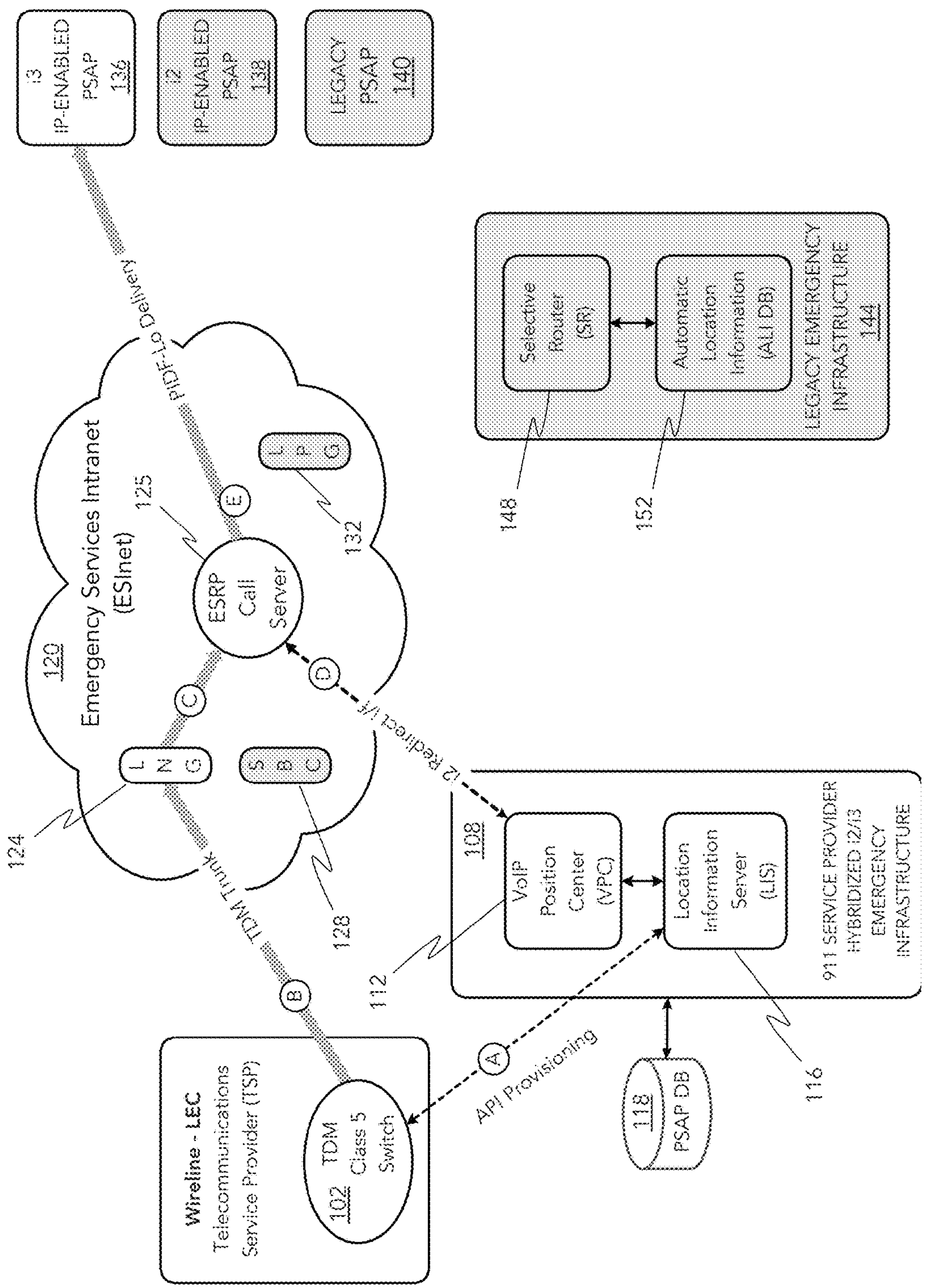
FIG. 4C illustrates a twelfth 911 call routing scenario within the Legacy to NG-911 network topology according to an embodiment.

FIG. 4C illustrates a twelfth 911 call routing scenario within the Legacy to NG-911 network topology according to an embodiment. In this scenario, the TSP is circuit-switched and includes TDM switch(es) 102 and the PSAP is an IP enabled PSAP 136 capable of PIDF-Lo delivery. The intervening 911 network infrastructure is VoIP or SIP based like PSAP 136. The basic call routing of this scenario has the call originating from an endpoint served by a circuit-switched TSP and handled by TDM switch(es) 102. The 911 call is forwarded to the ESINet 120 by way of a legacy network gateway (LNG) 124 for delivery to IP enabled PSAP 136.

There are some assumptions as to prior provisioning of data. For instance, the TSP has provisioned the 911 service provider's LIS 116 with the telephone numbers (TNs) and civic addresses of its customers (represented by the dotted arrow labeled "A"). Each civic address is geocoded and the destination PSAP is determined. In this case, the destination PSAP is determined to be an IP enabled PSAP 136 served by an ESINet 120. The LIS 116/VPC 112 combination comprising the hybridized i2/i3 emergency infrastructure 108 for a 911 service provider determines and stores the following information for this TN: its x/y coordinates, a URI identifying the SBC 128 associated with this PSAP 136, a civic address, and an MSAG address and, optionally a Last Routing Option (LRO).

It is also assumed the ESRP server 125 can support and process a SIP redirect message. The ESRP server 125 includes a mechanism to identify that all traffic coming from the circuit-switched TSP's TDM trunk needs to be directed to the 911 service provider emergency infrastructure 108. However, the LNG 124 may receive traffic from multiple TSPs. The ESRP server 125 must determine that a particular TN is to be processed the proper 911 service provider emergency infrastructure 108 VPC 112 while another call (coming from a wireless carrier, for example) does not. To overcome this, it is assumed the LNG 124 uses a specific unique IP source address for the incoming TDM trunk group that the ESRP server 125 can subsequently recognize or include a incoming Trunk Identifier in the SIP messaging. Lastly, the ESRP server 125 maintains an ESLK routing table capable of translating an ESLK to a destination PSAP 140.

With the above in mind, the actual call flow proceeds thusly. The arrows labeled "A", "B", and "C" function the same as described in FIG. 4A. Referring to arrow "D", a PIDF-Lo is included in the REDIRECT message. ESRP server 125 determines a destination PSAP using the PIDF-Lo and includes the PIDF-Lo in arrow "E". Referring to the arrow labeled "E", the ESRP server 125 uses the PIDF-Lo Location Object to find the destination PSAP 136 by querying a ECRF (this is the normal i3 process and is not shown). In this case the destination PSAP is fully IP enabled and PIDF-Lo capable. The ESRP server 125 proceeds with call setup to the UA at PSAP 136 and includes the PIDF-Lo object.

The embodiments described herein disclose systems and methods for intelligently structuring, handling, and enhancing communication sessions between or among communication devices including traditional telephony endpoints (e.g., phones) and non-traditional endpoints (e.g., automobiles, accessory devices, wearable accessory devices) among others. The systems and methods of the invention may be embodied in and performed by communication devices, call servers and other devices, and software instructions executed by some or all of such devices, as will be explained in detail below. The different types of networks contemplated herein include, for example, cellular mobile networks, the public switched telephone network (PSTN), and data networks, such as the Internet or other IP-based networks, including wide area networks, local area networks, and combinations thereof.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Although the flowcharts show a specific order of execution, it is understood that the order of execution may differ from that which is depicted. Also, steps shown in succession in the flowcharts may be executed concurrently or with partial concurrence. Further, in some embodiments, one or more of the steps shown in the flowcharts may be skipped or omitted. In addition, any number of counters, state variables, warning semaphores, or messages might be added to the logical flows described herein, for purposes of enhanced utility, accounting, performance measurement, or providing troubleshooting aids, etc. It is understood that all such variations are within the scope of the present disclosure.

Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

A memory is defined herein as including both volatile and nonvolatile memory and data storage components. Volatile components are those that do not retain data values upon loss of power. Nonvolatile components are those that retain data upon a loss of power. Thus, a memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may comprise additional systems designed to coordinate this communication, including, for example, performing load balancing. A processor may be of electrical or of some other available construction.

Although the components described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic, functionality or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An emergency call routing system, comprising:
a Voice-over Internet Protocol position center (VPC) server configured to:
receive a session initiation protocol (SIP) INVITE for an emergency call intended for a destination public safety answering point (PSAP) from a telecommunication service provider (TSP) SIP call server; and
respond to the source of the SIP INVITE message with a SIP Redirect response, the SIP Redirect response including routing data compatible with and capable of enabling the TSP SIP call server to route the emergency call to the destination PSAP such that the VPC is not in the bearer path of the emergency call;
a location information server (LIS) configured to:
receive and store telephone number provisioning information from a TSP, the information including registered address data for the telephone number; and
receive and store PSAP capability data, the PSAP capability data indicative of the PSAP operating under the i2 transitional standard for VoIP 911 or operating under the fully implemented i3 standard for VoIP 911; and
for PSAPs operating under the i2 transitional standard for VoIP 911, receive and respond to address requests for the telephone number that initiated the emergency call; or
for PSAPs operating under the fully implemented i3 standard for VoIP 911, provide a presence information data format location object (PIDF-Lo) within the SIP Redirect response, the PIDF-Lo to be included in an updated SIP INVITE.

2. The emergency call routing system of claim 1 wherein the TSP comprises a VoIP network.

3. The emergency call routing system of claim 1 wherein the PSAP routing data identifies the destination PSAP as TDM legacy circuit-switched capable.

4. The emergency call routing system of claim 1 wherein the PSAP routing data identifies the destination PSAP as IP enabled non-PIDF-Lo capable.

5. The emergency call routing system of claim 1 wherein the PSAP routing data identifies the destination PSAP as IP enabled PIDF-Lo capable.

6. The emergency call routing system of claim 1 wherein the PIDF-Lo comprises data indicative of an address.

7. The emergency call routing system of claim 1 wherein the PIDF-Lo comprises data indicative of a location.

8. An emergency call routing method, comprising:
in a Voice-over Internet Protocol position center (VPC) server:
receiving a session initiation protocol (SIP) INVITE for an emergency call intended for a destination public safety answering point (PSAP) from a telecommunication service provider (TSP) SIP call server; and
responding to the source of the SIP INVITE message with a SIP Redirect response, the SIP Redirect response including routing data compatible with and capable of enabling the TSP SIP call server to route the emergency call to the destination PSAP such that the VPC is not in the bearer path of the emergency call;
in a location information server (LIS):
receiving and storing telephone number provisioning information from a TSP, the information including registered address data for the telephone number; and
receiving and storing PSAP capability data, the PSAP capability data indicative of the PSAP operating under the i2 transitional standard for VoIP 911 or operating under the fully implemented i3 standard for VoIP 911; and
for PSAPs operating under the i2 transitional standard for VoIP 911, receiving and responding to address requests for the telephone number that initiated the emergency call; or
for PSAPs operating under the fully implemented i3 standard for VoIP 911, providing a presence information data format location object (PIDF-Lo) within the SIP Redirect response, the PIDF-Lo to be included in an updated SIP INVITE.

9. The emergency call routing method of claim 8 wherein the TSP comprises a VoIP network.

10. The emergency call routing method of claim 8 wherein the PSAP routing data identifies the destination PSAP as TDM legacy circuit-switched capable.

11. The emergency call routing method of claim 8 wherein the PSAP routing data identifies the destination PSAP as IP enabled non-PIDF-Lo capable.

12. The emergency call routing method of claim 8 wherein the PSAP routing data identifies the destination PSAP as IP enabled PIDF-Lo capable.

13. The emergency call routing method of claim 8 wherein the PIDF-Lo comprises data indicative of an address.

14. The emergency call routing method of claim 8 wherein the PIDF-Lo comprises data indicative of a location.

15. At least one machine-readable non-transitory medium comprising a set of instructions executable on a computing device operating as a Voice-over Internet Protocol (VoIP) position center (VPC) server and location information server (LIS) to cause the computing device to route emergency calls by:
receiving a session initiation protocol (SIP) INVITE for an emergency call intended for a destination public safety answering point (PSAP) from a telecommunication service provider (TSP) SIP call server;
responding to the source of the SIP INVITE message with a SIP Redirect response, the SIP Redirect response including routing data compatible with and capable of enabling the TSP SIP call server to route the emergency call to the destination PSAP such that the VPC is not in the bearer path of the emergency call;
receiving and storing telephone number provisioning information from a TSP, the information including registered address data for the telephone number;
receiving and storing PSAP capability data, the PSAP capability data indicative of the PSAP operating under the i2 transitional standard for VoIP 911 or operating under the fully implemented i3 standard for VoIP 911; and for PSAPs operating under the i2 transitional standard for VoIP 911, receiving and responding to address requests for the telephone number that initiated the emergency call; or for PSAPs operating under the fully implemented i3 standard for VoIP 911, providing a presence information data format location object (PIDF-Lo) within the SIP Redirect response, the PIDF-Lo to be included in an updated SIP INVITE.

16. The at least one machine-readable non-transitory medium of claim 15, wherein the TSP comprises a VoIP network.

17. The at least one machine-readable non-transitory medium of claim 15, wherein the PSAP routing data identifies the destination PSAP as TDM legacy circuit-switched capable.

18. The at least one machine-readable non-transitory medium of claim 15, wherein the PSAP routing data identifies the destination PSAP as IP enabled non-PIDF-Lo capable.

19. The at least one machine-readable non-transitory medium of claim 15, wherein the PSAP routing data identifies the destination PSAP as IP enabled PIDF-Lo capable.

20. The at least one machine-readable non-transitory medium of claim 15, wherein the PIDF-Lo comprises data indicative of an address.

21. The at least one machine-readable non-transitory medium of claim 15, wherein the PIDF-Lo comprises data indicative of a location.

* * * * *